(12) United States Patent
Bowers et al.

(10) Patent No.: US 8,634,144 B2
(45) Date of Patent: Jan. 21, 2014

(54) EVANESCENT ELECTROMAGNETIC WAVE CONVERSION METHODS I

(75) Inventors: Jeffrey A. Bowers, Kirkland, WA (US); Roderick A. Hyde, Redmond, WA (US); Edward K. Y. Jung, Bellevue, WA (US); John Brian Pendry, Surrey (GB); David Schurig, Raleigh, NC (US); David R. Smith, Durham, NC (US); Clarence T. Tegreene, Bellevue, WA (US); Thomas A. Weaver, San Mateo, CA (US); Charles Whitmer, North Bend, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 811 days.

(21) Appl. No.: 12/460,137

(22) Filed: Jul. 13, 2009

(65) Prior Publication Data

US 2010/0266239 A1    Oct. 21, 2010

Related U.S. Application Data

(63) Continuation-in-part of application No. 12/386,522, filed on Apr. 17, 2009.

(51) Int. Cl.
*G02B 3/00* (2006.01)
*H01P 1/17* (2006.01)

(52) U.S. Cl.
USPC .......... 359/642; 333/21 A; 333/21 R; 385/30; 343/909

(58) Field of Classification Search
USPC ......... 359/642; 333/21 R, 21 A, 115; 385/30; 343/909
See application file for complete search history.

(56) References Cited

U.S. PATENT DOCUMENTS

| 6,606,199 | B2 | 8/2003 | Wang |
| 7,062,348 | B1 | 6/2006 | Folta |
| 7,072,555 | B1 | 7/2006 | Figotin et al. |
| 8,179,331 | B1 | 5/2012 | Sievenpiper |
| 2006/0125681 | A1 | 6/2006 | Smith et al. |
| 2007/0188385 | A1 | 8/2007 | Hyde et al. |
| 2007/0242360 | A1 | 10/2007 | Rachford |
| 2008/0024792 | A1 | 1/2008 | Pendry et al. |
| 2008/0165079 | A1 | 7/2008 | Smith et al. |
| 2008/0316899 | A1 | 12/2008 | Hamada |

OTHER PUBLICATIONS

Balmain, Keith G. et al.; "Resonance Cone Formation, Reflection, Refraction, and Focusing in a Planar Anisotropic Metamaterial"; IEEE Antennas and Wireless Propagation Letters; 2002, pp. 146-149; vol. 1; IEEE.
Belov, Pavel A. et al.; "Subwavelength imaging at optical frequencies using a transmission device formed by a periodic layered metal-dielectric structure operating in the canalization regime"; Physical Review; 2006; pp. 1-4; B 73, 113110; The American Physical Society.
Cai, Wenshan et al.; "Nonmagnetic Cloak with Minimized Scattering"; Applied Physics Letters; Published Online Sep. 11, 2007; pp. 111105-1 to 111105-3; vol. 91; American Institute of Physics.

(Continued)

*Primary Examiner* — Evelyn A. Lester

(57) ABSTRACT

Apparatus, methods, and systems provide conversion of evanescent electromagnetic waves to non-evanescent electromagnetic waves and/or conversion of non-evanescent electromagnetic waves to evanescent electromagnetic waves. In some approaches the conversion includes propagation of electromagnetic waves within an indefinite electromagnetic medium, and the indefinite medium may include an artificially-structured material such as a layered structure or other metamaterial.

48 Claims, 14 Drawing Sheets

(56) References Cited

OTHER PUBLICATIONS

Cai, Wenshan et al.; "Optical Cloaking with Metamaterials"; Nature Photonics; Apr. 2, 2007; pp. 224-227; vol. 1; Nature Publishing Group.
Cummer, Steven A. et al.; "Full-Wave Simulations of Electromagnetic Cloaking Structures"; Physical Review E; Sep. 27, 2006; pp. 036621-1 to 036621-5; vol. 74; The American Physical Society.
Dewar, G.; "A Thin Wire Array and Magnetic Host Structure with $n<0$"; Journal of Applied Physics; May 17, 2005; pp. 10Q101-1 to 10Q101-3; vol. 97; American Institute of Physics.
Efimov, S.P.; "Compression of Electromagnetic Waves by Anisotropic Media ('Nonreflecting' Crystal Model)"; Radiophysics and Quantum Electronics; Sep. 1978; pp. 916-920; vol. 21, No. 9; Springer New York.
Fang, Nicholas et al.; "Sub-Diffraction-Limited Optical Imaging with a Silver Superlens"; Science; Apr. 22, 2005; 534-537 (+ cover page); vol. 308; www.sciencemag.org.
Fang, Nicholas et al.; "Supporting Online Material, Sub-Diffraction-Limited Optical Imaging with a Silver Superlens"; Science; 1-12; vol. 308; www.sciencemag.org.
Feng, Simin et al.; "Diffraction-suppressed high-resolution imaging through metallodielectric nanofilms"; Optics Express; Jan. 9, 2006; pp. 216-221; vol. 14, No. 1; Optical Society of America.
Fisher, R.K. et al.; "Resonance Cones in the Field Pattern of a Short Antenna in an Anisotropic Plasma"; Physical Review Letters; May 26, 1969; pp. 1093-1095; vol. 22, No. 21; Physical Review.
Han, Seunghoon et al.; "Ray Optics at a Deep-Subwavelength Scale: A Transformation Optics Approach"; Nano Letters; Oct. 29, 2008; pp. 4243-4247; 8 (12); American Chemical Society.
Hoffman, Anthony J. et al.; "Negative refraction in semiconductor metamaterials"; Nature Materials; Dec. 2007; pp. 946-950; vol. 6; Nature Publishing Group.
Hoffman, Anthony J. et al.; "Supplementary Information for Negative refraction in semiconductor metamaterials"; Nature Materials; 2007; pp. 1-8; Nature Publishing Group.
Ikonen, Pekka et al.; "Magnification of subwavelength field distributions at microwave frequencies using a wire medium slab operating in the canalization regime"; Applied Physics Letters; Sep. 4, 2007; pp. 1-3; 91, 104102; American Institute of Physics.
Jacob, Zubin et al.; "Optical Hyperlens: Far-field imaging beyond the diffraction limit"; Optics Express; Sep. 4, 2006; pp. 8247-8256; vol. 14, No. 18; OSA.
Kildishev, Alexander V. et al.; "Engineering space for light via transformation optics"; Optics Letters; Jan. 1, 2008; pp. 43-45; vol. 33, No. 1; Optical Society of America.
Lee, Hyesog et al.; "Design, fabrication and characterization of a Far-Field Superlens"; Solid State Communications; Feb. 13, 2008; pp. 202-207; 146; www.sciencedirect.com.
Lee, Hyesog et al.; "Development of optical hyperlens for imaging below the diffraction limit"; Optics Express; Nov. 26, 2007; pp. 15886-15891; vol. 15, No. 24; Optical Society of America.
Leonhardt, Ulf; Philbin, Thomas G.; "General Relativity in Electrical Engineering"; New Journal of Physics; 2006; pp. 1-18; vol. 8, No. 247; IOP Publishing Ltd and Deutsche Physikalische Gesellschaft.
Linden, Stefan et al.; "Photonic Metamaterials: Magnetism at Optical Frequencies"; IEEE Journal of Selected Topics in Quantum Electronics; Nov./Dec. 2006; pp. 1097-1105; vol. 12, No. 6; IEEE.
Liu, Zhaowei et al.; "Far-Field Optical Hyperlens Magnifying Sub-Diffraction-Limited Objects"; Science; Mar. 23, 2007; pp. 1686; vol. 315; www.sciencemag.org.
Liu, Zhaowei et al.; "Supporting Online Material for Far-Field Optical Hyperlens Magnifying Sub-Diffraction-Limited Objects"; Science; Mar. 23, 2007; pp. 1-3; vol. 315; located at www.sciencemag.org/cgi/content/full/315/5819/1686/DC1; www.sciencemag.org.
Pendry, J.B. et al.; "Controlling Electromagnetic Fields"; Science; Jun. 23, 2006; pp. 1780-1782 (8 Total Pages including Supporting Material); vol. 312; located at: www.sciencemag.org.
Pendry, J.B.; Ramakrishna, S.A.; "Focussing Light Using Negative Refraction"; J. Phys. [Condensed Matter]; 2003; pp. 1-22; vol. 15.
Pendry, J.B. et al.; "Magnetism from Conductors and Enhanced Nonlinear Phenomena"; IEEE Transactions on Microwave Theory and Techniques; Nov. 1999; pp. 2075-2084; vol. 47, No. 11; IEEE.
Pendry, J.B.; "Metamaterials and the Control of Electromagnetic Fields"; Conference on Coherence and Quantum Optics; OSA Technical Digest; 2007; pp. 111; paper CMB2; OSA.
Pendry, J.B.; "Negative Refraction Makes a Perfect Lens"; Physical Review Letters; Oct. 30, 2000; pp. 3966-3969; vol. 85, No. 18; American Physical Society.
Pendry, J.B. et al.; "Refining the perfect lens"; Physica B; 2003; pp. 329-332; 338; Science Direct.
Rahm, Marco et al.; "Optical Design of Reflectionless Complex Media by Finite Embedded Coordinate Transformations"; Physical Review Letters; Feb. 15, 2008; pp. 063903-1-063903-4; 100, 063903 (2008); The American Physical Society.
Ramakrishna, S. Anantha et al.; "Imaging the Near Field"; J. Mod. Opt.; 2003; pp. 1419-1430; 50 (9); Journal of Modern Optics.
Ramakrishna, S. Anantha et al.; "Removal of absorption and increase in resolution in a near-field lens via optical gain"; Physical Review; 2003; pp. 1-4; 67 201101; The American Physical Society.
Rill, Michael S. et al.; "Photonic metamaterials by direct laser writing and silver chemical vapour deposition"; Nature Materials; Jul. 2008; pp. 543-546; vol. 7; Macmillan Publishers Limited.
Salandrino, Alessandro et al.; "Far-field subdiffraction optical microscopy using metamaterial crystals: Theory and simulations"; Physical Review; Aug. 15, 2006; pp. 075103-1-075103-5; 74, 075103 (2006); The American Physical Society.
Schurig, D. et al.; "Calculation of Material Properties and Ray Tracing in Transformation Media"; Optics Express; Oct. 16, 2006; pp. 9794-9804; vol. 14, No. 21; OSA.
Schurig, D. et al.; "Metamaterial Electromagnetic Cloak at Microwave Frequencies"; Science; Nov. 10, 2006; pp. 977-980 (18 Total Pages including Supporting Material); vol. 314; located at: www.sciencemag.org.
Schurig, D. et al.; "Sub-Diffraction imaging with compensating bilayers"; New Journal of Physics; Aug. 8, 2005; pp. 1-15; 7; IOP Publishing Ltd and Deutsche Physikalische Gesellschaft.
Schurig, D. et al.; "Transformation-designed optical elements"; Optics Express; Oct. 29, 2007; pp. 14772-14782; vol. 15, No. 22; OSA.
Shalaev, Vladimir M.; "Optical Negative-Index Metamaterials"; Nature Photonics; Jan. 2007; pp. 41-48; vol. 1; Nature Publishing Group.
Shvets, G. et al.; "Guiding, Focusing, and Sensing on the Subwavelength Scale Using Metallic Wire Arrays"; Physical Review Letters; Aug. 3, 2007; pp. 1-4; PRL 99, 053903; The American Physical Society.
Shvets, Gennady; "Photonic approach to making a material with a negative index of refraction"; Physical Review B; Jan. 16, 2003; pp. 1-8; 67, 035109; The American Physical Society.
Smith, D.R.; Schurig, D.; "Electromagnetic Wave Propagation in Media with Indefinite Permittivity and Permeability Tensors"; Physical Review Letters; Feb. 21, 2003; pp. 077405-1 to 077405-4; vol. 90, No. 7; The American Physical Society.
Smith, David R.; "How to Build a Superlens"; Science; Apr. 22, 2005; pp. 502-503; vol. 308; American Association for the Advancement of Science.
Smith, D.R. et al.; "Metamaterials and Negative Refractive Index"; Science; Aug. 6, 2004; pp. 788-792; vol. 305; located at: www.sciencemag.org.
Smolyaninov, Igor I. et al.; "Far-Field Optical Microscopy with a Nanometer-Scale Resolution Based on the In-Plane Image Magnification by Surface Plasmon Polaritons"; Physical Review Letters; Feb. 11, 2005; 1-4; PRL 94, 057401; The American Physical Society.
Smolyaninov, Igor I. et al.; "Magnifying Superlens in the Visible Frequency Range"; Science; Mar. 23, 2007; pp. 1699-1701; vol. 315;; www.sciencemag.org.
Srituravanich, Werayut et al.; "Flying plasmonic lens in the near field for high-speed nanolithography"; Nature Nanotechnology; Oct. 12, 2008; pp. 1-5; Macmillan Publishers Limited.

(56) References Cited

OTHER PUBLICATIONS

Taubner, Thomas et al.; "Near-Field Microscopy Through a SiC Superlens"; Science; Sep. 15, 2006; pp. 1595 (3 pages total including supporting material); vol. 313; AAAS; located at www.sciencemag.org.

Valentine, Jason et al.; "Three-dimensional optical metamaterial with a negative refractive index"; Nature; 2008; pp. 1-5; Macmillan Publishers Limited.

Ward, A.J.; Pendry, J.B.; "Refraction and Geometry in Maxwell's Equations"; Journal of Modern Optics; 1996; pp. 773-793; vol. 43; Taylor & Francis Ltd.

Wood, B. et al.; "Directed subwavelength imaging using a layered metal-dielectric system"; Physical Review B; Sep. 20, 2006; pp. 1-8; 74, 115116; The American Physical Society.

Xiong, Yi et al.; "Two-Dimensional Imaging by Far-Field Superlens at Visible Wavelengths"; Nano Letters; Jul. 7, 2007; pp. 3360-3365; vol. 7, No. 11; American Chemical Society.

Yao, Jie et al.; "Optical Negative Refraction in Bulk Metamaterials of Nanowires"; Science; Aug. 15, 2008; pp. 930 (3 pages total including supporting material); vol. 321; AAAS; located at www.sciencemag.org.

Zharov, Alexander A. et al.; "Birefringent Left-Handed Metamaterials and Perfect Lenses for Vectorial Fields"; New Journal of Physics; 2005; pp. 1-9; vol. 7; IOP Publishing Ltd. and Deutsche Physikalische Gesellschaft.

Zhang, Xiang et al.; "Superlenses to overcome the diffraction limit"; Nature Materials; Jun. 2008; pp. 435-441; vol. 7; Nature Publishing Group.

PCT International Search Report; International App. No. US 10/01154; bearing a date of Jun. 22, 2010; pp. 1-3.

Sievenpiper et al.; "A Tunable Impedance Surface Performing as a Reconfigurable Beam Steering Reflector"; IEEE Transactions on Antennas and Propagation; bearing a date of Mar. 2002; pp. 384-390; vol. 50, No. 3; IEEE.

Sievenpiper et al.; "Two-Dimensional Beam Steering Using an Electrically Tunable Impedance Surface"; IEEE Transactions on Antennas and Propagation; bearing a date of Oct. 2003; pp. 2713-2722; vol. 51, No. 10; IEEE.

US 8,634,144 B2

EVANESCENT ELECTROMAGNETIC WAVE CONVERSION METHODS I

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/386,522, entitled EVANESCENT ELECTROMAGNETIC WAVE CONVERSION APPARATUS I, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/386,523, entitled EVANESCENT ELECTROMAGNETIC WAVE CONVERSION APPARATUS II, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/386,521, entitled EVANESCENT ELECTROMAGNETIC WAVE CONVERSION APPARATUS III, naming Jeffrey A. Bowers, Roderick A. Hyde, Edward K. Y. Jung, John Brian Pendry, David Schurig, David R. Smith, Clarence T. Tegreene, Thomas Allan Weaver, Charles Whitmer, Lowell L. Wood, Jr. as inventors, filed Apr. 17, 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The application discloses apparatus and methods that may relate to electromagnetic responses that include electromagnetic near-field lensing and/or conversion of evanescent electromagnetic waves to non-evanescent electromagnetic waves and/or conversion of non-evanescent electromagnetic waves to evanescent electromagnetic waves.

DETAILED DESCRIPTION

Figure 1:
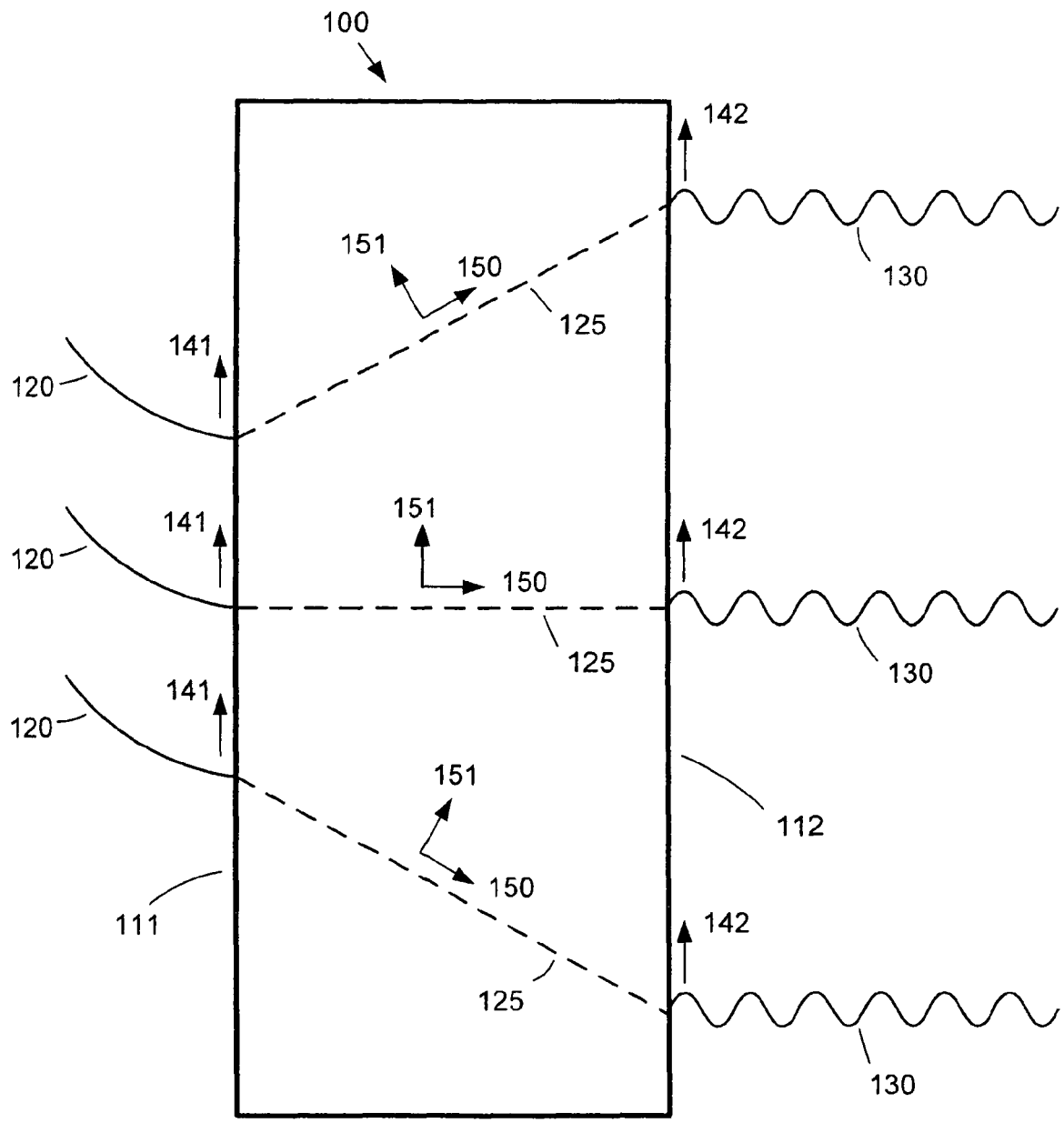
FIG. 1 depicts a conversion structure having first and second surface regions that are substantially planar and substantially parallel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Embodiments provide apparatus and methods for converting evanescent electromagnetic waves to non-evanescent electromagnetic waves and/or for converting non-evanescent electromagnetic waves to evanescent electromagnetic waves. In general, an evanescent electromagnetic wave is an electromagnetic wave having an amplitude that decays exponentially with distance, e.g. having a wave vector that is at least partially imaginary. For example, the electric component of an electromagnetic wave may have a 2D Fourier expansion given by $$E(r, t) = \sum_{\sigma, k_x, k_y} E_\sigma(k_x, k_y) \exp(ik_z z + ik_x x + ik_y y - i\omega t). \quad (1)$$

Supposing, for purposes of illustration, that the wave exists in a medium with refractive index n, the Fourier modes having $k_x^2 + k_y^2 < n^2 \omega^2 / c^2$ are propagating electromagnetic waves with real wavevector components $k_z = \pm \sqrt{n^2 \omega^2 c^{-2} - k_x^2 - k_y^2}$, while the Fourier modes having $k_x^2 + k_y^2 > n^2 \omega^2 / c^2$ are evanescent electromagnetic waves with imaginary wavevector components $k_z = \pm i\sqrt{k_x^2 + k_y^2 - n^2 \omega^2 c^{-2}}$. The evanescent electromagnetic waves decay exponentially with distance z. In a conventional far-field optics application, where z may represent, for example, distance from an object plane of a conventional far-field optical system, the evanescent waves do not substantially persist beyond an evanescent range $\mu \sim 1/|k_z|$, corresponding to a near field of the object plane (or a near field in the vicinity of an object to be imaged), while the propagating waves persist beyond the near field into the far field to comprise a far-field image (e.g. on an image plane of the conventional far-field optical system). Thus, a conventional far-field optical system has a resolution limit $\Delta$ (sometimes referred to as a diffraction limit or an Abbe-Rayleigh limit) corresponding to a maximum transverse wavevector $k_{max}$ for propagating waves:

$$\Delta \sim \frac{2\pi}{k_{max}} = \frac{2\pi c}{n\omega} = \frac{c}{n\nu} = \frac{\lambda_0}{n} \quad (2)$$

where $\lambda_0$ is the free-space wavelength corresponding to frequency $\nu$. On the other hand, embodiments disclosed herein provide apparatus and methods that may exceed this resolution limit, by converting evanescent waves to propagating waves (or vice versa) in an indefinite electromagnetic medium.

In general, an indefinite electromagnetic medium is an electromagnetic medium having electromagnetic parameters (e.g. permittivity and/or permeability) that include indefinite tensor parameters. Throughout this disclosure, including the subsequent claims, the term "indefinite" is taken to have its algebraic meaning; thus, an indefinite tensor is a tensor that is neither positive definite (having all positive eigenvalues) nor negative definite (having all negative eigenvalues) but instead has at least one positive eigenvalue and at least one negative eigenvalue. Some exemplary indefinite media are described in D. R. Smith and D. Schurig, "Indefinite materials," U.S. patent application Ser. No. 10/525,191; D. R. Smith and D. Schurig, "Electromagnetic wave propagation in media with indefinite permittivity and permeability tensors," Phys. Rev. Lett. 90, 077405 (2003); and D. R. Smith and D. Schurig, "Sub-diffraction imaging with compensating bilayers," New. J. Phys. 7, 162 (2005); each of which is herein incorporated by reference.

In some embodiments an indefinite medium is an electromagnetic medium having an indefinite permeability. An example of an indefinite permeability medium is a planar slab having a z-axis perpendicular to the slab (with x- and y-axes parallel to the slab) and electromagnetic parameters $\epsilon_y$, $\mu_x$, and $\mu_z$ satisfying the inequalities $$\epsilon_y \mu_x > 0, \mu_x/\mu_z < \quad (3)$$

Figure 10:
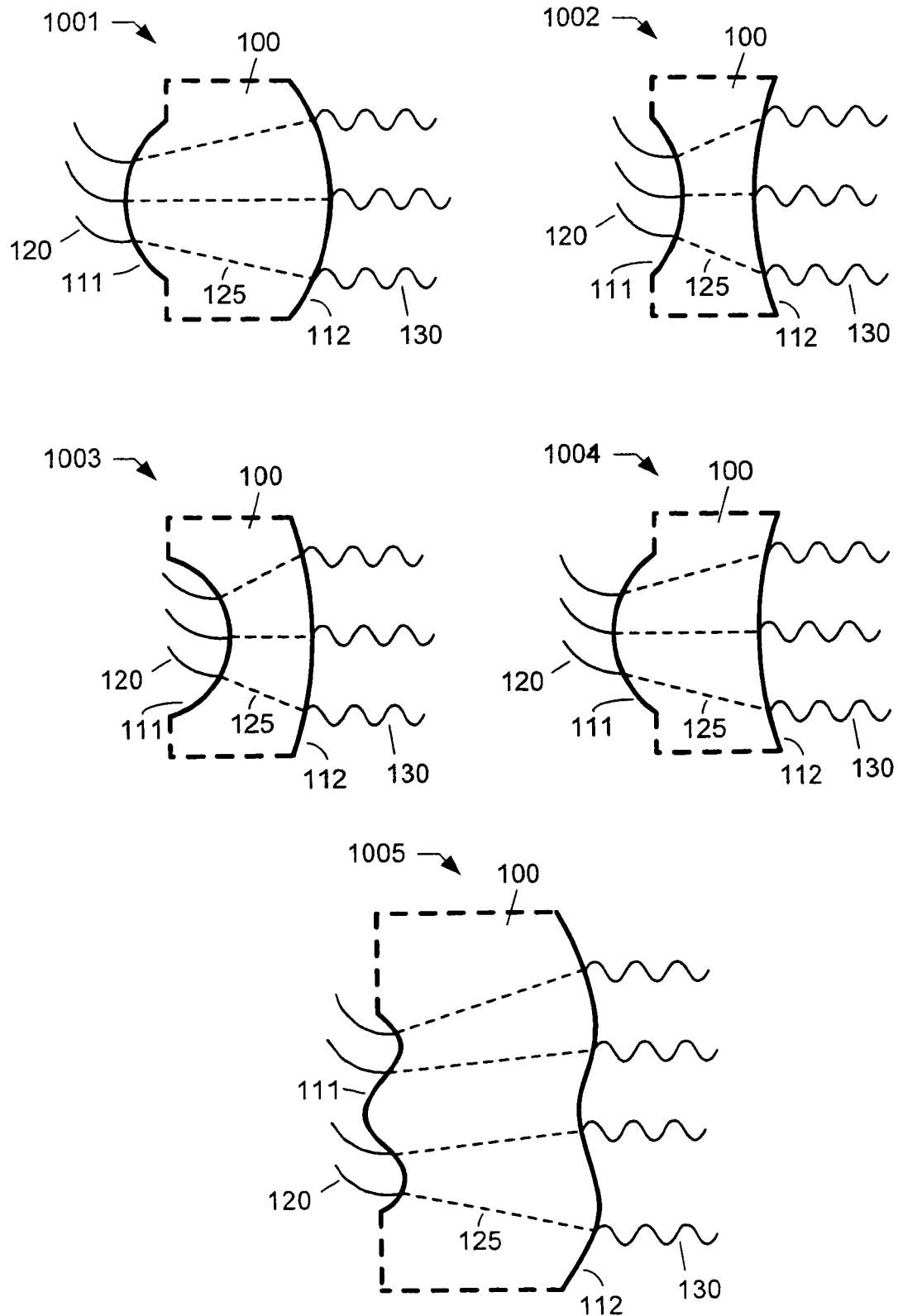
FIG. 10 depicts various conversion structures having first and second surface regions that are substantially nonplanar.

(thus, the permeability is indefinite, with either $\mu_x < 0 < \mu_z$ or $\mu_x > 0 > \mu_z$). For TE-polarized (i.e. s-polarized) electromagnetic waves with an electric field directed along the y-axis, these electromagnetic parameters provide a hyperbolic dispersion relation $$k_z^2 = \epsilon_y \mu_x \frac{\omega^2}{c^2} - \frac{\mu_x}{\mu_z} k_x^2 \quad (4)$$

that admits propagating electromagnetic waves (real $k_z$) with large transverse wavevectors $k_x$. Thus, if the planar slab adjoins a uniform refractive medium with index of refraction n, an evanescent wave in the adjoining medium (e.g. as in equation (1), with $k_x > n\omega/c$) becomes a propagating wave in the indefinite medium (or, reciprocally, a propagating wave in the indefinite medium becomes an evanescent wave in the adjoining medium). For sufficiently large $k_x$ (i.e. substantially within the asymptotic domain of the hyperbolic dispersion relation (4)), the propagating wave is characterized by group velocities that are substantially perpendicular to the asymptotes of equation (4), i.e. the propagating wave is substantially conveyed along propagation directions in the xz-plane that form an angle $\theta_x = \tan^{-1}(|\mu_x/\mu_z|)$ with respect to the z-axis (e.g. as depicted in FIG. 10 of the previously cited U.S. patent application Ser. No. 10/525,191); moreover, for sufficiently small $\mu_x$ (i.e. $|\mu_x|$ substantially equal to zero and/or substantially less than $|\mu_z|$), the angle $\theta_x$ becomes substantially equal to zero and the multiple propagating directions degenerate to a single propagation direction that substantially coincides with the z-axis (in this case the indefinite medium shall be referred to as a degenerate indefinite medium). The planar slab may alternately or additionally have electromagnetic parameters $\epsilon_x$ and $\mu_y$, satisfying the alternate or additional inequalities $$\epsilon_x \mu_y > 0, \mu_y/\mu_z < 0, \quad (5)$$

providing another hyperbolic dispersion relation $$k_z^2 = \epsilon_x \mu_y \frac{\omega^2}{c^2} - \frac{\mu_y}{\mu_z} k_y^2 \quad (6)$$

for TE-polarized electromagnetic waves with an electric field directed along the x-axis. In this case, for sufficiently large $k_y$ (i.e. substantially within the asymptotic domain of the hyperbolic dispersion relation (6)), a propagating wave in the indefinite medium is characterized by group velocities that are substantially perpendicular to the asymptotes of equation (6), i.e. the propagating wave is substantially conveyed along propagation directions in the yz-plane that form an angle $\theta_y = \tan^{-1}(|\mu_y/\mu_z|)$ with respect to the z-axis; moreover, for sufficiently small $\mu_y$ (i.e. $|\mu_y|$ substantially equal to zero and/ or substantially less than $|\mu_z|$), the angle $\theta_y$ becomes substantially equal to zero and the multiple propagating directions degenerate to a single propagation direction that substantially coincides with the z-axis (another degenerate indefinite medium). When the planar slab satisfies both inequalities (3)

and (5), the indefinite medium supports TE-polarized waves that substantially propagate (for sufficiently large transverse wavevectors $k_x$ and/or $k_y$) along propagation directions that compose an elliptical cone having a cone axis that coincides with the z-direction and half-angles $\theta_x$ and $\theta_y$, as above, with respect to the x- and y-axes, and in the case where $\epsilon_x = \epsilon_y$ and $\mu_x = \mu_y$, the planar slab is a uniaxial medium that provides the same hyperbolic dispersion for any TE-polarized waves, and the propagation directions for large transverse wavevectors compose a circular cone with $\theta_x = \theta_y$.

More generally, in some embodiments an indefinite permeability medium may define an axial direction that corresponds to a first eigenvector of the indefinite permeability matrix, with first and second transverse directions that correspond to second and third eigenvectors of the indefinite permeability matrix, respectively. The parameters of the indefinite permeability matrix may vary with position within the indefinite permeability medium, and correspondingly the eigenvectors of the indefinite permeability matrix may also vary with position within the indefinite permeability medium. The disclosure of the preceding paragraph may encompass more general embodiments of an indefinite permeability medium, in the following manner: the z-axis shall be understood to refer more generally to an axial direction that may vary throughout the indefinite medium, the x-axis shall be understood to refer more generally to a first transverse direction perpendicular to the axial direction, and the y-axis shall be understood to refer more generally to a second transverse direction mutually perpendicular to the axial direction and the first transverse direction. Thus, for example, a uniaxial indefinite permeability medium may have a local axial parameter $\mu_A$ (corresponding to an axial direction that may vary with position within the medium) and transverse parameters $\epsilon_{T1} = \epsilon_{T2} = \epsilon_T$, $\mu_{T1} = \mu_{T2} = \mu_T$ that satisfy the inequalities $$\epsilon_T \mu_T > 0, \mu_T/\mu_A < 0, \quad (7)$$

providing a hyperbolic dispersion relation $$k_A^2 = \epsilon_T \mu_T \frac{\omega^2}{c^2} - \frac{\mu_T}{\mu_A} k_T^2, \quad (8)$$

and this dispersion relation supports TE-polarized waves that substantially propagate (for sufficiently large transverse wavevectors $k_T$) along propagation directions that locally compose a circular cone having a cone axis that coincides with the local axial direction with a cone half-angle $\theta = \tan^{-1}(|\mu_T/\mu_A|)$ (and where $|\mu_T| \ll |\mu_A|$, the medium is a degenerate indefinite medium, wherein the cone of propagation directions degenerates to a single propagation direction that substantially coincides with the local axial direction).

In some embodiments an indefinite medium is an electromagnetic medium having an indefinite permittivity. An example of an indefinite permittivity medium is a planar slab having a z-axis perpendicular to the slab (with x- and y-axes parallel to the slab), and having electromagnetic parameters $\mu_y$, $\epsilon_x$, and $\epsilon_z$ satisfying the inequalities $$\mu_y \epsilon_x > 0, \epsilon_x/\epsilon_z < 0 \quad (9)$$

(thus, the permittivity is indefinite, with either $\epsilon_x < 0 < \epsilon_z$ or $\epsilon_x > 0 > \epsilon_z$). For TM-polarized (i.e. p-polarized) electromagnetic waves with a magnetic field directed along the y-axis, these electromagnetic parameters provide a hyperbolic dispersion relation $$k_z^2 = \mu_y \epsilon_x \frac{\omega^2}{c^2} - \frac{\epsilon_x}{\epsilon_z} k_x^2 \quad (10)$$

that admits propagating electromagnetic waves (real $k_z$) with large transverse wavevectors $k_x$. Thus, if the planar slab adjoins a uniform refractive medium with index of refraction n, an evanescent wave in the adjoining medium (e.g. as in equation (1), with $k_x > n\omega/c$) becomes a propagating wave in the indefinite medium (or, reciprocally, a propagating wave in the indefinite medium becomes an evanescent wave in the adjoining medium). For sufficiently large $k_x$ (i.e. substantially within the asymptotic domain of the hyperbolic dispersion relation (10)), the propagating wave is characterized by group velocities that are substantially perpendicular to the asymptotes of equation (10), i.e. the propagating wave is substantially conveyed along propagation directions in the xz-plane that form an angle $\theta_x = \tan^{-1}(|\epsilon_x/\epsilon_z|)$ with respect to the z-axis; moreover, for sufficiently small $\epsilon_x$ (i.e. $|\epsilon_x|$ substantially equal to zero and/or substantially less than $|\epsilon_z|$), the angle $\theta_x$ becomes substantially equal to zero and the multiple propagating directions degenerate to a single propagation direction that substantially coincides with the z-axis (in this case the indefinite medium shall be referred to as a degenerate indefinite medium). The planar slab may alternately or additionally have electromagnetic parameters $\mu_x$ and $\epsilon_y$, satisfying the alternative or additional inequalities $$\mu_x \epsilon_y > 0, \epsilon_y/\epsilon_z < 0, \quad (11)$$

providing another hyperbolic dispersion relation $$k_z^2 = \mu_x \epsilon_y \frac{\omega^2}{c^2} - \frac{\epsilon_y}{\epsilon_z} k_y^2 \quad (12)$$

for TM-polarized electromagnetic waves with a magnetic field directed along the x-axis. In this case, for sufficiently large $k_y$ (i.e. substantially within the asymptotic domain of the hyperbolic dispersion relation (12)), a propagating wave in the indefinite medium is characterized by group velocities that are substantially perpendicular to the asymptotes of equation (12), i.e. the propagating wave is substantially conveyed along propagation directions in the yz-plane that form an angle $\theta_y = \tan^{-1}(|\epsilon_y/\epsilon_z|)$ with respect to the z-axis; moreover, for sufficiently small $\epsilon_y$ (i.e. $|\epsilon_y|$ substantially equal to zero and/or substantially less than $|\epsilon_z|$), the angle $\theta_y$ becomes substantially equal to zero and the multiple propagation directions degenerate to a single propagation direction that substantially coincides with the z-axis (another degenerate indefinite medium). When the planar slab satisfies both inequalities (9) and (11), the indefinite medium supports TM-polarized waves that substantially propagate (for sufficiently large transverse wavevectors $k_x$ and/or $k_y$) along propagation directions that compose an elliptical cone having a cone axis that coincides with the z-direction and half-angles $\theta_x$ and $\theta_y$, as above, with respect to the x- and y-axes, and in the case where $\epsilon_x = \epsilon_y$ and $\mu_x = \mu_y$, the planar slab is a uniaxial medium that provides the same hyperbolic dispersion for any TM-polarized waves, and the propagation directions for large transverse wavevectors compose a circular cone with $\theta_x = \theta_y$.

More generally, in some embodiments an indefinite permittivity medium may define an axial direction that corresponds to a first eigenvector of the indefinite permittivity matrix, with first and second transverse directions that correspond to second and third eigenvectors of the indefinite permittivity matrix, respectively. The parameters of the indefinite permittivity matrix may vary with position within the indefinite permittivity medium, and correspondingly the eigenvectors of the indefinite permittivity matrix may also vary with position within the indefinite permittivity medium. The disclosure of the preceding paragraph may encompass more general embodiments of an indefinite permittivity medium, in the following manner: the z-axis shall be understood to refer more generally to an axial direction that may vary throughout the indefinite medium, the x-axis shall be understood to refer more generally to a first transverse direction perpendicular to the axial direction, and the y-axis shall be understood to refer more generally to a second transverse direction mutually perpendicular to the axial direction and the first transverse direction. Thus, for example, a uniaxial indefinite permittivity) medium may have a local axial parameter $\varepsilon_A$ (corresponding to an axial direction that may vary with position within the medium) and transverse parameters $\varepsilon_{T1}=\varepsilon_{T2}=\varepsilon_T$, $\mu_{T1}=\varepsilon_{T2}=\mu_T$ that satisfy the inequalities $$\varepsilon_T \mu_T > 0, \varepsilon_T/\varepsilon_A < 0, \tag{13}$$

providing a hyperbolic dispersion relation $$k_A^2 = \varepsilon_T \mu_T \frac{\omega^2}{c^2} - \frac{\varepsilon_T}{\varepsilon_A} k_T^2, \tag{14}$$

and this dispersion relation supports TM-polarized waves that substantially propagate (for sufficiently large transverse wavevectors $k_T$) along propagation directions that locally compose a circular cone having a cone axis that coincides with the local axial direction with a cone half-angle $\theta = \tan^{-1}(|\varepsilon_T/\varepsilon_A|)$ (and where $|\varepsilon_T| \ll |\varepsilon_A|$, the medium is a degenerate indefinite medium, wherein the cone of propagation directions degenerates to a single propagation direction that substantially coincides with the local axial direction).

In some embodiments an indefinite medium is an electromagnetic medium that is "doubly indefinite," i.e. having both an indefinite permittivity and an indefinite permeability. An example of a doubly indefinite medium is a planar slab defining a z-axis perpendicular to the slab (with x- and y-axes parallel to the slab), and having electromagnetic parameters satisfying one or both of equations (3) and (5) (providing indefinite permeability) and one or both of equations (9) and (11) (providing indefinite permittivity). The doubly-indefinite planar slab provides a hyperbolic dispersion relation for at least one TE-polarized wave (as in equations (4) and/or (6)) and further provides a hyperbolic dispersion relation for at least one TM-polarized wave (as in equations (10) and (12)), with wave propagation features as discussed in the preceding paragraphs containing the equations that are referenced here.

In some embodiments a doubly-indefinite medium may have an indefinite permittivity matrix and an indefinite permeability matrix that are substantially simultaneously diagonalizable, and the doubly-indefinite medium defines an axial direction that corresponds to a first common eigenvector of the indefinite matrices, with first and second transverse directions that correspond to second and third common eigenvectors of the indefinite matrices, respectively. As in the preceding examples, the parameters of the indefinite matrices may vary with position within the doubly-indefinite medium, and correspondingly the common eigenvectors of the indefinite matrices may also vary with position within the doubly-indefinite medium. The disclosure of the preceding paragraph may encompass more general embodiments of a doubly-indefinite medium, in the following manner: the z-axis shall be understood to refer more generally to an axial direction that may vary throughout the doubly-indefinite medium, the x-axis shall be understood to refer more generally to a first transverse direction perpendicular to the axial direction, and the y-axis shall be understood to refer more generally to a second transverse direction mutually perpendicular to the axial direction and the first transverse direction. Thus, for example, a uniaxial doubly-indefinite medium may have local axial parameters $\varepsilon_A$, $\mu_A$ (corresponding to an axial direction that may vary with position within the medium) and transverse parameters $\varepsilon_{T1}=\varepsilon_{T2}=\varepsilon_T$, $\mu_{T1}=\mu_{T2}=\mu_T$ that satisfy the inequalities (7) and (13), providing hyperbolic dispersion relations (8) and (14), and these dispersion relations respectively support TE- and TM-polarized waves within the doubly-indefinite medium, as discussed in the preceding paragraphs containing the equations that are referenced here.

Some embodiments provide an indefinite medium that is a transformation medium, i.e. an electromagnetic medium having properties that may be characterized according to transformation optics. Transformation optics is an emerging field of electromagnetic engineering, and transformation optics devices include structures that influence electromagnetic waves, where the influencing imitates the bending of electromagnetic waves in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths and beyond.

A first exemplary transformation optics device is the electromagnetic cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electric permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, D. Schurig, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transformation optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

A fourth exemplary transformation optics device is illustrated by embodiments of the various focusing and/or focus-adjusting structures described in J. A. Bowers et al, "Focusing and sensing apparatus, methods, and systems," U.S. patent application Ser. No. 12/156,443; J. A. Bowers et al, "Emitting and focusing apparatus, methods, and systems," U.S. patent application Ser. No. 12/214,534; J. A. Bowers et al, "Negatively-refractive focusing and sensing apparatus, methods, and systems," U.S. patent application Ser. No. 12/220,705; J. A. Bowers et al, "Emitting and negatively-refractive focusing apparatus, methods, and systems," U.S. patent application Ser. No. 12/220,703; J. A. Bowers et al, "Negatively-refractive focusing and sensing apparatus, methods, and systems," U.S. patent application Ser. No. 12/228,140; and J. A. Bowers et al, "Emitting and negatively-refractive focusing apparatus, methods, and systems," U.S. patent application Ser. No. 12/228,153; each of which is herein incorporated by reference. In embodiments described therein, a focusing and/or focusing-structure includes a transformation medium that provides an extended depth of focus/field greater than a nominal depth of focus/field, or an interior focus/field region with an axial magnification that is substantially greater than or less than one.

Additional exemplary transformation optics devices are described in D. Schurig et al, "Transformation-designed optical elements," Opt. Exp. 15, 14772 (2007); M. Rahm et al, "Optical design of reflectionless complex media by finite embedded coordinate transformations," Phys. Rev. Lett. 100, 063903 (2008); and A. Kildishev and V. Shalaev, "Engineering space for light via transformation optics," Opt. Lett. 33, 43 (2008); each of which is herein incorporated by reference.

In general, for a selected coordinate transformation, a transformation medium can be identified wherein electromagnetic fields evolve as in a curved coordinate space corresponding to the selected coordinate transformation. Constitutive parameters of the transformation medium can be obtained from the equations:

$$\tilde{\in}^{i'j'} = [\det(\Lambda)]^{-1} \Lambda_i^{i'} \Lambda_j^{j'} \in^{ij} \quad (15)$$

$$\tilde{\mu}^{i'j'} = [\det(\Lambda)]^{-1} \Lambda_i^{i'} \Lambda_j^{j'} \mu^{ij} \quad (16)$$

where $\tilde{\in}$ and $\tilde{\mu}$ are the permittivity and permeability tensors of the transformation medium, $\in$ and $\mu$ are the permittivity and permeability tensors of the original medium in the untransformed coordinate space, and $$\Lambda_i^{i'} = \frac{\partial x^{i'}}{\partial x^i} \quad (17)$$

is the Jacobian matrix corresponding to the coordinate transformation. In some applications, the coordinate transformation is a one-to-one mapping of locations in the untransformed coordinate space to locations in the transformed coordinate space, and in other applications the coordinate transformation is a one-to-many mapping of locations in the untransformed coordinate space to locations in the transformed coordinate space. Some coordinate transformations, such as one-to-many mappings, may correspond to a transformation medium having a negative index of refraction. In some applications, the transformation medium is an indefinite medium, i.e. an electromagnetic medium having an indefinite permittivity and/or an indefinite permeability (these transformation media may be referred to as "indefinite transformation media"). For example, in equations (15) and (16), if the original permittivity matrix $\in$ is indefinite, then the transformed permittivity matrix $\tilde{\in}$ is also indefinite; and/or if the original permeability matrix $\mu$ is indefinite, then the transformed permeability matrix $\tilde{\mu}$ is also indefinite. In some applications, only selected matrix elements of the permittivity and permeability tensors need satisfy equations (15) and (16), e.g. where the transformation optics response is for a selected polarization only. In other applications, a first set of permittivity and permeability matrix elements satisfy equations (15) and (16) with a first Jacobian $\Lambda$, corresponding to a first transformation optics response for a first polarization of electromagnetic waves, and a second set of permittivity and permeability matrix elements, orthogonal (or otherwise complementary) to the first set of matrix elements, satisfy equations (15) and (16) with a second Jacobian $\Lambda'$, corresponding to a second transformation optics response for a second polarization of electromagnetic waves. In yet other applications, reduced parameters are used that may not satisfy equations (15) and (16), but preserve products of selected elements in (15) and selected elements in (16), thus preserving dispersion relations inside the transformation medium (see, for example, D. Schurig et al (2), supra, and W. Cai et al, "Optical cloaking with metamaterials," Nature Photonics 1, 224 (2007), herein incorporated by reference). Reduced parameters can be used, for example, to substitute a magnetic response for an electric response, or vice versa. While reduced parameters preserve dispersion relations inside the transformation medium (so that the ray or wave trajectories inside the transformation medium are unchanged from those of equations (15) and (16)), they may not preserve impedance characteristics of the transformation medium, so that rays or waves incident upon a boundary or interface of the transformation medium may sustain reflections (whereas in general a transformation medium according to equations (15) and (16) is substantially nonreflective or sustains the reflection characteristics of the original medium in the untransformed coordinate space). The reflective or scattering characteristics of a transformation medium with reduced parameters can be substantially reduced or eliminated (modulo any reflection characteristics of the original medium in the untransformed coordinate space) by a suitable choice of coordinate transformation, e.g. by selecting a coordinate transformation for which the corresponding Jacobian Λ (or a subset of elements thereof) is continuous or substantially continuous at a boundary or interface of the transformation medium (see, for example, W. Cai et al, "Norunagnetic cloak with minimized scattering," Appl. Phys. Lett. 91, 111105 (2007), herein incorporated by reference).

Embodiments of an indefinite medium and/or a transformation medium (including embodiments of indefinite transformation media) can be realized using artificially-structured materials. Generally speaking, the electromagnetic properties of artificially-structured materials derive from their structural configurations, rather than or in addition to their material composition.

In some embodiments, the artificially-structured materials are photonic crystals. Some exemplary photonic crystals are described in J. D. Joannopoulos et al, *Photonic Crystals. Molding the Flow of Light*, $2^{nd}$ Edition, Princeton Univ. Press, 2008, herein incorporated by reference. In a photonic crystals, photonic dispersion relations and/or photonic band gaps are engineered by imposing a spatially-varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al, "Variable metamaterial apparatus," U.S. patent application Ser. No. 11/355,493; D. Smith et al, "Metamaterials," International Application No. PCT/US2005/026052; D. Smith et al, "Metamaterials and negative refractive index," Science 305, 788 (2004); D. Smith et al, "Indefinite materials," U.S. patent application Ser. No. 10/525,191; C. Caloz and T. Itoh, *Electromagnetic Metamaterials. Transmission Line Theory and Microwave Applications*, Wiley-Interscience, 2006; N. Engheta and R. W. Ziolkowski, eds., *Metamaterials. Physics and Engineering Explorations*, Wiley-Interscience, 2006; and A. K. Sarychev and V. M. Shalaev, *Electrodynamics of Metamaterials*, World Scientific, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (cf. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivities, permeabilities, and/or magnetoelectric coefficients can be positive or negative, complex (having loss or gain), anisotropic (including tensor-indefinite), variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (cf. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, or other variations along some continuous structure (e.g. etchings on a substrate). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striphines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

In some embodiments a metamaterial may include a layered structure. For example, embodiments may provide a structure having a succession of adjacent layers, where the layers have a corresponding succession of material properties that include electromagnetic properties (such as permittivity and/or permeability). The succession of adjacent layers may be an alternating or repeating succession of adjacent layers, e.g. a stack of layers of a first type interleaved with layers of a second type, or a stack that repeats a sequence of three or more types of layers. When the layers are sufficiently thin (e.g. having thicknesses smaller than an operating wavelength of the metamaterial), the layered structure may be characterized as an effective continuous medium having effective constitutive parameters that relate to the electromagnetic properties of the individual layers. For example, consider a planar stack of layers of a first material (of thickness $d_1$, and having homogeneous and isotropic electromagnetic parameters $\epsilon_1, \mu_1$) interleaved with layers of a second material (of thickness $d_2$, and having homogeneous and isotropic electromagnetic parameters $\epsilon_2, \mu_2$); then the layered structure may be characterized as an effective continuous medium having (effective) anisotropic constitutive parameters $$\varepsilon_x = \varepsilon_y = \frac{\varepsilon_1 + \eta \varepsilon_2}{1+\eta}, \quad (18)$$

$$\frac{1}{\varepsilon_z} = \frac{1}{1+\eta}\left(\frac{1}{\varepsilon_1} + \frac{\eta}{\varepsilon_2}\right), \quad (19)$$

$$\mu_x = \mu_y = \frac{\mu_1 + \eta \mu_2}{1+\eta}, \quad (20)$$

$$\frac{1}{\mu_z} = \frac{1}{1+\eta}\left(\frac{1}{\mu_1} + \frac{\eta}{\mu_2}\right) \quad (21)$$

where $\eta = d_2/d_1$ is the ratio of the two layer thicknesses, z is the direction normal to the layers, and x, y are the directions parallel to the layers. When the two materials comprising the interleaved structure have electromagnetic parameters that are oppositely-signed, the constitutive parameters (18)-(21) may correspond to an indefinite medium. For example, when the first material is a material having a permittivity $\epsilon_1 < 0$ and the second material is a material having a permittivity $\epsilon_2 > 0$, the ratio $\eta$ may be selected to provide an indefinite permittivity matrix according to equations (18)-(19) (moreover, for $\eta$ substantially equal to $|\epsilon_1/\epsilon_2|$, the indefinite permittivity medium is substantially a degenerate indefinite permittivity medium). Alternately or additionally, when the first material is a material having a permeability $\mu_1 < 0$ and the second material is a material having a permeability $\mu_2 > 0$, the ratio $\eta$ may be selected to provide an indefinite permeability matrix according to equations (20)-(21) (moreover, for $\eta$ substantially equal to $|\mu_1/\mu_2|$, the indefinite permeability medium is substantially a degenerate indefinite permeability medium).

Exemplary planar stacks of alternating materials, providing an effective continuous medium having an indefinite permittivity matrix, include an alternating silver/silica layered system described in B. Wood et al, "Directed subwavelength imaging using a layered medal-dielectric system," Phys. Rev. B 74, 115116 (2006), and an alternating doped/undoped semiconductor layered system described in A. J. Hoffman, "Negative refraction in semiconductor metamaterials," Nature Materials 6, 946 (2007), each of which is herein incorporated by reference. More generally, materials having a positive permittivity include but are not limited to: semiconductors (e.g. at frequencies higher than a plasma frequency of the semiconductor) and insulators such as dielectric crystals (e.g. silicon oxide, aluminum oxide, calcium fluoride, magnesium fluoride), glasses, ceramics, and polymers (e.g. photoresist, PMMA). Generally these materials have a positive permeability as well (which may be substantially equal to unity if the material is substantially nonmagnetic). In some embodiments a positive permittivity material is a gain medium, which may be pumped, for example, to reduce or overcome other losses such as ohmic losses (cf. an exemplary alternating silver/gain layered system described in S. Ramakrishna and J. B. Pendry, "Removal of absorption and increase in resolution in a near-field lens via optical gain," Phys. Rev. B 67, 201101(R) (2003), herein incorporated by reference). Examples of gain media include semiconductor laser materials (e.g. GaN, AlGaAs), doped insulator laser materials (e.g. rare-earth doped crystals, glasses, or ceramics), and Raman gain materials. Materials having a negative permeability include but are not limited to: ferrites, magnetic garnets or spinels, artificial ferrites, and other ferromagnetic or ferrimagnetic materials (e.g. at frequencies above a ferromagnetic or ferrimagnetic resonance frequency of the material; cf. F. J. Rachford, "Tunable negative refractive index composite," U.S. patent application Ser. No. 11/279/460, herein incorporated by reference). Materials having a negative permittivity include but are not limited to: metals (e.g. at frequencies less than a plasma frequency of the metal) including the noble metals (Cu, Au, Ag); semiconductors (e.g. at frequencies less than a plasma frequency of the semiconductor); and polar crystals (e.g. SiC, LiTaO$_3$, LiF, ZnSe) at frequencies within a restrahlen band of the polar crystal (cf. G. Schvets, "Photonic approach to making a material with a negative index of refraction," Phys. Rev. B 67, 035109 (2003) and T. Tauber et al, "Near-field microscopy through a SiC superlens," Science 313, 1595 (2006), each of which is herein incorporated by reference). For applications involving semiconductors, the plasma frequency (which may be regarded as a frequency at which the semiconductor permittivity changes sign) is related to the density of free carriers within the semiconductor, and this free carrier density may be controlled in various ways (e.g. by chemical doping, photodoping, temperature change, carrier injection, etc.). Thus, for example, a layered system comprising interleaved layers of a first semiconductor material having a first plasma frequency and a second semiconductor material having a second plasma frequency may provide an indefinite permittivity (per equations (18)-(19)) in a window of frequencies intermediate the first plasma frequency and the second plasma frequency, and this window may be controlled, e.g., by differently doping the first and second semiconductor materials.

In some applications a layered structure includes a succession of adjacent layers that are substantially nonplanar. The preceding exemplary layered structure—consisting of successive planar layers, each layer having a layer normal direction (the z direction) that is constant along the transverse extent of the layer and a layer thickness that is constant along the transverse extent of the layer—may be extended to a nonplanar layered structure, consisting of successive nonplanar layers, each layer having a layer normal direction that is non-constant along the transverse extent of the layer and, optionally, a layer thickness that is non-constant along the transverse extent of the layer. Some examples of cylindrical and/or spherical layered structures are described in A. Salandrino and N. Engheta, "Far-field subdiffraction optical microscopy using metamaterial crystals: Theory and simulations," Phys. Rev. B 74, 075103 (2006); Z. Jacob et al, "Optical hyperlens: Far-field imaging beyond the diffraction limit," Opt. Exp. 14, 8247 (2006); Z. Liu et al, "Far field optical hyperlens magnifying sub-diffraction-limited objects," Science 315, 1686 (2007); and H. Lee, "Development of optical hyperlens for imaging below the diffraction limit," Opt. Exp. 15, 15886 (2007); each of which is herein incorporated by reference. More generally, for an alternating nonplanar layered structure, supposing that the layers have curvature radii substantially less than their respective thicknesses, and transverse layer thickness gradients substantially less than one, the nonplanar layered structure may be characterized as an effective continuous medium having (effective) anisotropic constitutive parameters as in equations (18)-(21), where the z direction is replaced by a layer normal direction that may vary with position within the layered structure, the x direction is replaced by a first transverse direction perpendicular to the layer normal direction, the y direction is replaced by a second transverse direction mutually perpendicular to the layer normal direction and the first transverse direction, and the layer thickness ratio $\eta=d_2/d_1$ is a ratio of local layer thicknesses $d_1$ and $d_2$ that may vary with position throughout the layered structure (so the ratio $\eta$ may vary with position as well). The nonplanar layered structure may thus provide an indefinite medium having a spatially-varying axial direction that corresponds to the layer normal direction. Suppose, for example, that the spatially-varying axial direction of an indefinite medium is given by a vector field $u_A(r)$ that is equal to or parallel to a conservative vector field, i.e.

$$u_A \propto \nabla \Phi \qquad (22)$$

for a scalar potential function $\Phi$; then the indefinite medium may be provided by a nonplanar layered structure where the interfaces of adjacent layers correspond to equipotential surfaces of the function $\Phi$.

Nonplanar layered structures may be fabricated by various methods that are known to those of skill in the art. In a first example, J. A. Folta, "Dynamic mask for producing uniform or graded-thickness thin films," U.S. Pat. No. 7,062,348 (herein incorporated by reference), describes vapor deposition systems that utilize a moving mask, where the velocity and position of the moving mask may be computer controlled to precisely tailor the thickness distributions of deposited films. In a second example, Tzu-Yu Wang, "Graded thickness optical element and method of manufacture therefor," U.S. Pat. No. 6,606,199 (herein incorporated by reference), describes methods for depositing graded thickness layers through apertures in a masking layer.

With reference flow to FIG. 1, an illustrative embodiment is depicted that includes a conversion structure 100 with indefinite electromagnetic parameters, the conversion structure having a first surface region 111 and a second surface region 112, the first surface region and the second surface region being substantially planar and substantially parallel. This and other drawings, unless context dictates otherwise, can represent a planar view of a three-dimensional embodiment, or a two-dimensional embodiment (e.g. in FIG. 1 where the conversion structure is placed inside a metallic or dielectric slab waveguide oriented normal to the page). The conversion structure is responsive to an evanescent electromagnetic wave (depicted schematically as exponential tails 120) at the first surface region to convey a propagating electromagnetic wave (depicted schematically as dashed rays 125) from the first surface region to the second surface region, and to provide a non-evanescent electromagnetic wave (depicted schematically as the wavy rays 130) at the second surface region. In some embodiments the provided non-evanescent electromagnetic wave is a freely-propagating electromagnetic wave, e.g. a wave that is transmitted by and freely radiates from the second surface region (including diverging propagating waves, converging propagating waves, and substantially planar propagating waves). In other embodiments the provided non-evanescent wave is a confinedly-propagating electromagnetic wave, e.g. a wave that is transmitted by the second surface region into a propagating guided wave mode (as in a waveguide, transmission line, optical fiber, etc.) While the first and second surface regions 111 and 112 are depicted in FIG. 1 as exterior surfaces of the conversion structure 100, in other embodiments the first surface region and/or the second surface region may be at least partially interior to the conversion structure (e.g. where the conversion structure includes one or more of a refractive cladding, an impedance-matching layer, input or output optical components, etc.). The use of a ray description, in FIG. 1 and elsewhere, is a heuristic convenience for purposes of visual illustration, and is not intended to connote any limitations or assumptions of geometrical optics; further, the elements depicted in FIG. 1 can have spatial dimensions that are variously less than, greater than, or comparable to a wavelength of interest. At the first surface region 111, the evanescent electromagnetic wave 120 may be characterized by a first transverse wavevector $k_T^{(1)}$ (corresponding to a surface parallel direction of the first surface region indicated as the vectors 141 in FIG. 1) that exceeds a first maximum transverse wavevector $k_{max}^{(1)}$ for non-evanescent waves (cf. equation (2) and related preceding text):

$$k_T^{(1)} > k_{max}^{(1)} = \frac{2\pi n_1 f}{c} = \frac{2\pi f}{v_1} \qquad (23)$$

where f is the frequency of the evanescent electromagnetic wave and $v_1$ is a phase velocity (at the frequency f) for electromagnetic waves in a first region outside the conversion structure 100 and adjacent to the first surface region 111 (the phase velocity may correspond to an index of refraction $n_1$ for a refractive medium, possibly vacuum, in the first region, according to the relation $v_1=c/n_1$). At the second surface region 112, the non-evanescent electromagnetic wave 130 may be characterized by a second transverse wavevector $k_T^{(2)}$ (corresponding to a surface parallel direction of the second surface region indicated as the vectors 142 in FIG. 1) that does not exceed a second maximum transverse wavevector $k_{max}^{(2)}$ for non-evanescent waves (cf. equation (2) and related preceding text):

$$k_T^{(2)} < k_{max}^{(2)} = \frac{2\pi n_2 f}{c} = \frac{2\pi f}{v_2} \qquad (24)$$

where f is the frequency of the non-evanescent electromagnetic wave and $v_2$ is a phase velocity (at the frequency f) for electromagnetic waves in a second region outside the conversion structure 100 and adjacent to the second surface region 112 (the phase velocity may correspond to an index of refraction $n_2$ for a refractive medium, possibly vacuum, in the second region, according to the relation $v_2=c/n_2$, where $n_2$ may be equal to or different than $n_1$).

In the illustrative embodiment of FIG. 1, the conversion structure 100 has indefinite electromagnetic parameters, i.e. the conversion structure provides an indefinite medium (i.e. an electromagnetic medium having an indefinite permittivity and/or an indefinite permeability, as discussed above) that is responsive to the evanescent electromagnetic wave 120 to convey a propagating electromagnetic wave from the first surface region 111 to the second surface region 112. The indefinite medium defines an axial direction (indicated by the vectors 150 at various positions within the indefinite medium), which, as previously discussed, corresponds to a first eigenvector of the indefinite permittivity matrix and/or the indefinite permeability matrix; and the indefinite medium further defines a transverse direction (indicated by the vectors 151 at various positions within the indefinite medium) that is perpendicular to the axial direction and corresponds to a second eigenvector of the indefinite permittivity matrix and/ or the indefinite permeability matrix. In the illustrative embodiment of FIG. 1, the axial direction 150 is a nonconstant axial direction that is a function of location within the conversion structure 100, i.e. the axial direction may be regarded as a vector field (a vector-valued function of location). Moreover, the axial direction is generally directed from the first surface region 111 to the second surface region 112, i.e. axial field lines corresponding to the axial direction vector field extend from the first surface region to the second surface region. In FIG. 1, the dashed rays 125, indicating the propagating electromagnetic wave, also correspond to axial field lines, because the illustrative embodiment depicts a degenerate indefinite medium, i.e. an indefinite medium, as described previously, that substantially conveys electromagnetic energy along a propagation direction that corresponds to the axial direction of the indefinite medium. (This depiction is not intended to be limiting: in other embodiments, the indefinite medium is a "non-degenerate" indefinite medium that substantially conveys electromagnetic energy along multiple propagation directions—e.g. along at least two propagation directions, each of the at least two directions having a substantially common angle with respect to the axial direction, or along a plurality of propagation directions, the plurality of propagation directions substantially composing a cone having a cone axis that substantially coincides with the axial direction.)

Referring again to FIG. 1, the propagating electromagnetic field 125 may be characterized by a transverse wavevector $k_T$ that corresponds to the transverse direction 151. In the present example, the axial field lines (corresponding to the vector field that describes the axial direction 150) diverge geometrically as they proceed from the first surface region 111 to the second surface region 112, and this geometric divergence may provide a substantially continuous variation of the transverse wavevector $k_T$, from a first transverse wavevector $k_T^{(1)}$ at the first surface region (as in equation (23)), to match the transverse wavevector of the evanescent electromagnetic wave 120) to a second transverse wavevector $k_T^{(2)}$ at the second surface region (as in equation (24), to match the transverse wavevector of the non-evanescent electromagnetic wave 130). Thus, the geometric divergence of the axial field lines admits the conversion of an evanescent electromagnetic wave 120 to a non-evanescent electromagnetic wave 130, by supporting a propagating electromagnetic wave 125 having a substantially continuous variation of transverse wavevector from an initial transverse wavevector that exceeds a maximum wavevector for non-evanescent waves to a final transverse wavevector that does not exceed a maximum wavevector for non-evanescent waves.

Figure 2:
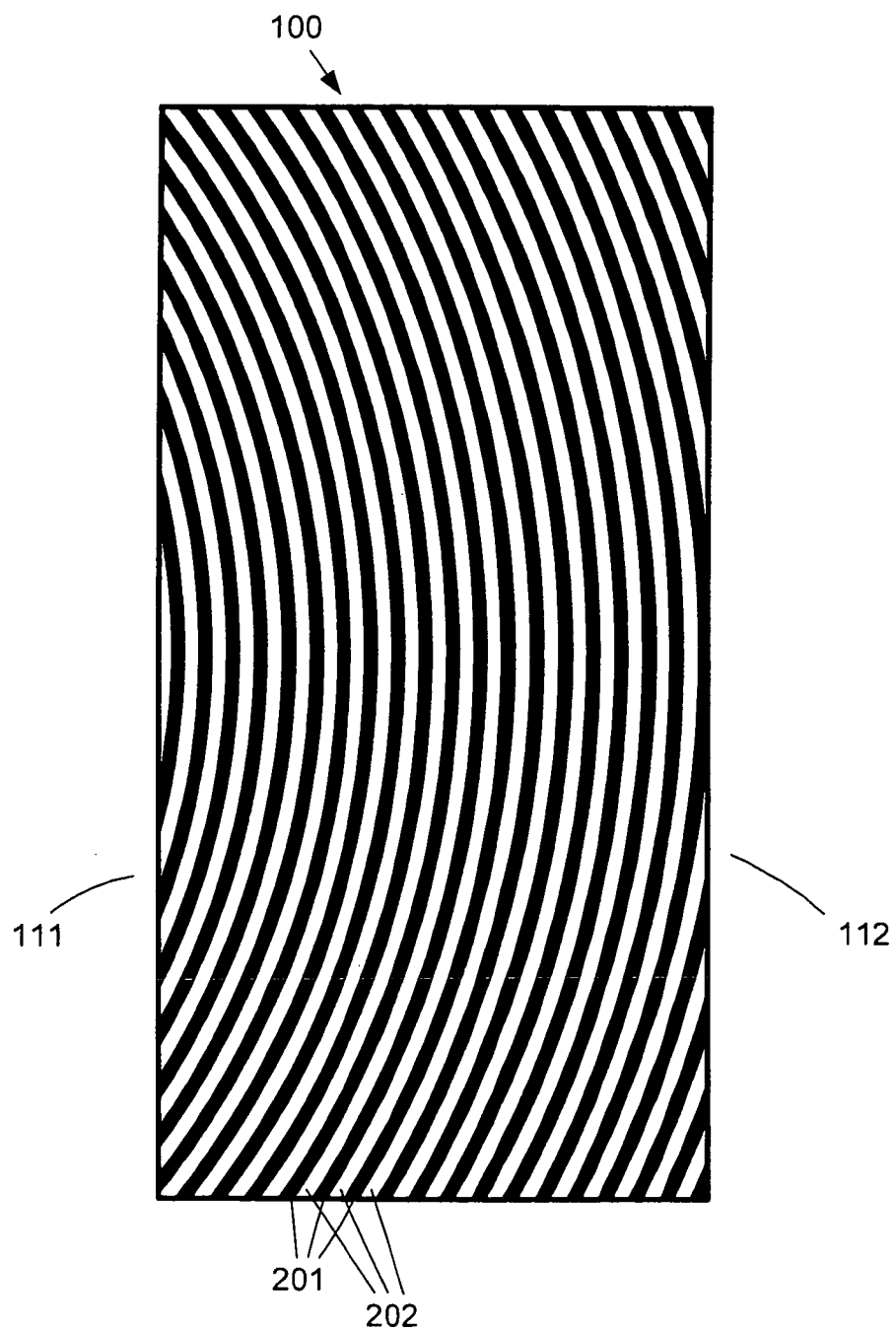
FIG. 2 depicts a layered structure as an exemplary implementation of the conversion structure of FIG. 1.
Figure 3:
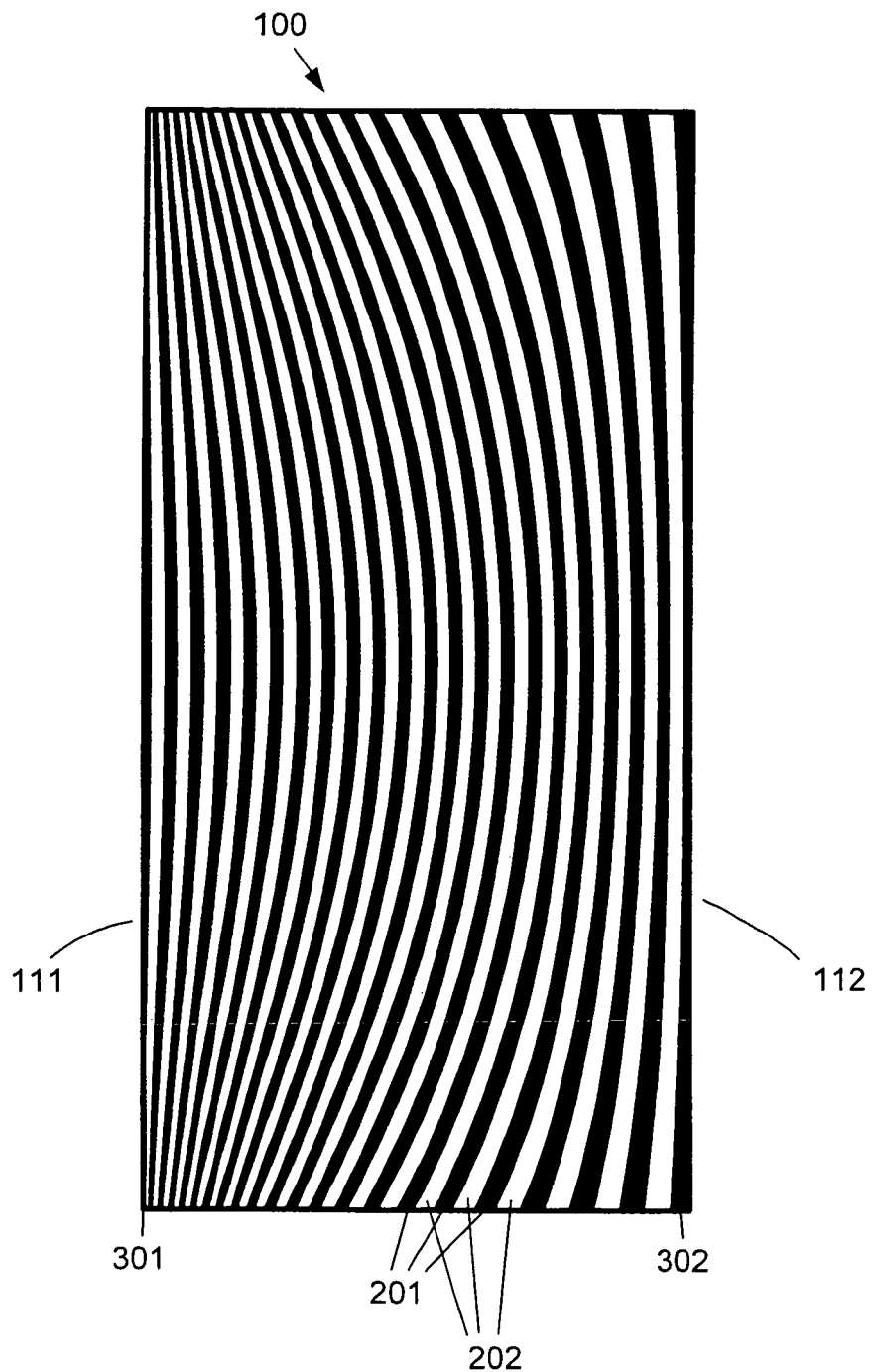
FIG. 3 depicts a layered structure as an exemplary implementation of the conversion structure of FIG. 1.

With reference now to FIGS. 2 and 3, layered structures are depicted as exemplary implementations of the conversion structure 100 of FIG. 1. In the exemplary implementations of FIGS. 2 and 3, the conversion structure 100 includes (as above) a first surface region 111 and a second surface region 112 that are substantially planar and substantially parallel; intermediate the first and second surface regions, a layered structure provides an effective continuous medium that corresponds to an indefinite medium. The layered structure includes layers of a first material 201 interleaved with layers of a second material 202, where the first and second materials have electromagnetic parameters (e.g. permittivities and/or permeabilities) that are oppositely-signed, as described previously. In the exemplary implementations of FIGS. 2 and 3, the alternating layers 201 and 202 are substantially nonplanar, having a layer normal direction that varies with position throughout the layered structure (i.e. from layer to layer and/or along the transverse extent of each layer), and this layer normal direction corresponds to the axial direction (as depicted by the vectors 150 in FIG. 1) of the provided indefinite medium (equivalently, regarding the interfaces between alternating layers 201 and 202 as equipotential surfaces of a scalar function Φ, the gradient of Φ is locally parallel to the axial direction 150 as per equation (22)). In the exemplary implementation of FIG. 3, a first layer 301 of the layered structure substantially coincides with the first surface region 111, and a last layer 302 of the layered structure substantially coincides with the second surface region 112, but this is not intended to be limiting (e.g. in the exemplary implementation of FIG. 2, neither the first surface region 111 nor the second surface region 112 substantially coincides with a layer of the layered structure). The nonplanar alternating layers may have substantially uniform thickness throughout the transverse extents of the layers, as in FIG. 2; or substantially non-uniform thicknesses throughout the transverse extents of the layers, as in FIG. 3; or a combination thereof.

Figure 4:
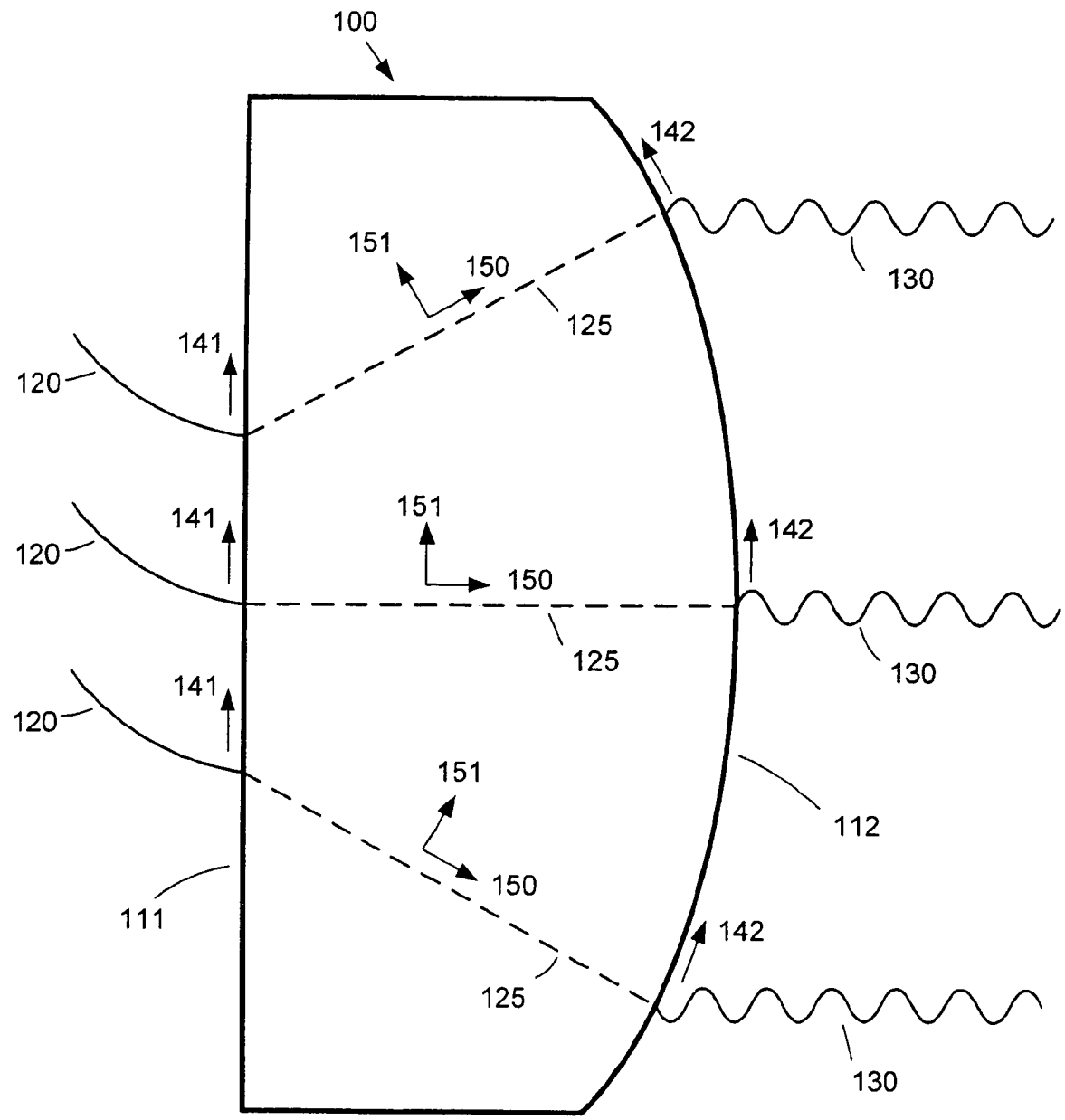
FIG. 4 depicts a conversion structure having a first surface region that is substantially planar and a second surface region that is substantially nonplanar.

With reference now to FIG. 4, an illustrative embodiment is depicted that includes a conversion structure 100 with indefinite electromagnetic parameters, the conversion structure having a first surface region 111 that is substantially planar and a second surface region 112 that is substantially nonplanar. In the illustrative embodiment, the substantially nonplanar second surface region 112 is depicted as a convex surface region (i.e. the configuration is a "plano-convex" configuration), but this is an exemplary configuration and is not intended to be limiting: other embodiments (not depicted) provide a substantially nonplanar second surface region 112 that is concave (a "plano-concave" configuration), or that includes a first subregion that is concave and a second subregion that is convex. This and other drawings, unless context dictates otherwise, can represent a planar view a of a three-dimensional embodiment, or a two-dimensional embodiment (e.g. in FIG. 4 where the conversion structure is placed inside a metallic or dielectric slab waveguide oriented normal to the page). The conversion structure is responsive to an evanescent electromagnetic wave (depicted schematically as exponential tails 120) at the first surface region to convey a propagating electromagnetic wave (depicted schematically as dashed rays 125) from the first surface region to the second surface region, and to provide a non-evanescent electromagnetic wave (depicted schematically as the wavy rays 130) at the second surface region. In some embodiments the provided non-evanescent electromagnetic wave is a freely-propagating electromagnetic wave, e.g. a wave that is transmitted by and freely radiates from the second electromagnetic surface (including diverging propagating waves, converging propagating waves, and substantially planar propagating waves). In other embodiments the provided non-evanescent wave is a confinedly-propagating electromagnetic wave, e.g. a wave that is transmitted by the second electromagnetic surface into a propagating guided wave mode (as in a waveguide, transmission line, optical fiber, etc.) While the first and second surface regions 111 and 112 are depicted in FIG. 4 as exterior surfaces of the conversion structure 100, in other embodiments the first surface region and/or the second surface region may be at least partially interior to the conversion structure (e.g. where the conversion structure includes one or more of a refractive cladding, an impedance-matching layer, input or output optical components, etc.). The use of a ray description, in FIG. 4 and elsewhere, is a heuristic convenience for purposes of visual illustration, and is not intended to connote any limitations or assumptions of geometrical optics; further, the elements depicted in FIG. 4 can have spatial dimensions that are variously less than, greater than, or comparable to a wavelength of interest. At the first surface region 111, the evanescent electromagnetic wave 120 may be characterized by a first transverse wavevector $k_T^{(1)}$ (corresponding to a surface parallel direction of the first surface region indicated as the vectors 141 in FIG. 4) that exceeds a first maximum transverse wavevector $k_{max}^{(1)}$ defined as in equation (23). At the second surface region 112, the non-evanescent electromagnetic wave 130 may be characterized by a second transverse wavevector $k_T^{(2)}$ (corresponding to a surface parallel direction of the second surface region indicated as the vectors 142 in FIG. 4) that does not exceed a second maximum transverse wavevector $k_{max}^{(2)}$ defined as in equation (24).

In the illustrative embodiment of FIG. 4, the conversion structure 100 has indefinite electromagnetic parameters, i.e. the conversion structure provides an indefinite medium (i.e. an electromagnetic medium having an indefinite permittivity and/or an indefinite permeability, as discussed above) that is responsive to the evanescent electromagnetic wave 120 to convey a propagating electromagnetic wave from the first surface region 111 to the second surface region 112. The indefinite medium defines an axial direction (indicated by the vectors 150 at various positions within the indefinite medium), which, as previously discussed, corresponds to a first eigenvector of the indefinite permittivity matrix and/or the indefinite permeability matrix; and the indefinite medium further defines a transverse direction (indicated by the vectors 151 at various positions within the indefinite medium) that is perpendicular to the axial direction and corresponds to a second eigenvector of the indefinite permittivity matrix and/or the indefinite permeability matrix. In the illustrative embodiment of FIG. 4, the axial direction 150 is a non-constant axial direction that is a function of location within the conversion structure 100, i.e. the axial direction may be regarded as a vector field (a vector-valued function of location). Moreover, the axial direction is generally directed from the first surface region 111 to the second surface region 112, i.e. axial field lines corresponding to the axial direction vector field extend from the first surface region to the second surface region. In FIG. 4, the dashed rays 125, indicating the propagating electromagnetic wave, also correspond to axial field lines, because the illustrative embodiment depicts a degenerate indefinite medium, i.e. an indefinite medium, as described previously, that substantially conveys electromagnetic energy along a propagation direction that corresponds to the axial direction of the indefinite medium. (This depiction is not intended to be limiting: in other embodiments, the indefinite medium is a "non-degenerate" indefinite medium that substantially conveys electromagnetic energy along multiple propagation directions—e.g. along at least two propagation directions, each of the at least two directions having a substantially common angle with respect to the axial direction, or along a plurality of propagation directions, the plurality of propagation directions substantially composing a cone having a cone axis that substantially coincides with the axial direction.)

Referring again to FIG. 4, the propagating electromagnetic field 125 may be characterized by a transverse wavevector $k_T$ that corresponds to the transverse direction 151. In the present example, the axial field lines (corresponding to the vector field that describes the axial direction 150) diverge geometrically as they proceed from the first surface region 111 to the second surface region 112, and this geometric divergence may provide a substantially continuous variation of the transverse wavevector $k_T$, from a first transverse wavevector $k_T^{(1)}$ at the first surface region (as in equation (23), to match the transverse wavevector of the evanescent electromagnetic wave 120) to a second transverse wavevector $k_T^{(2)}$ at the second surface region (as in equation (24), to match the transverse wavevector of the non-evanescent electromagnetic wave 130). Thus, the geometric divergence of the axial field lines admits the conversion of an evanescent electromagnetic wave 120 to a non-evanescent electromagnetic wave 130, by supporting a propagating electromagnetic wave 125 having a substantially continuous variation of transverse wavevector from an initial transverse wavevector that exceeds a maximum wavevector for non-evanescent waves to a final transverse wavevector that does not exceed a maximum wavevector for non-evanescent waves.

Figure 5:
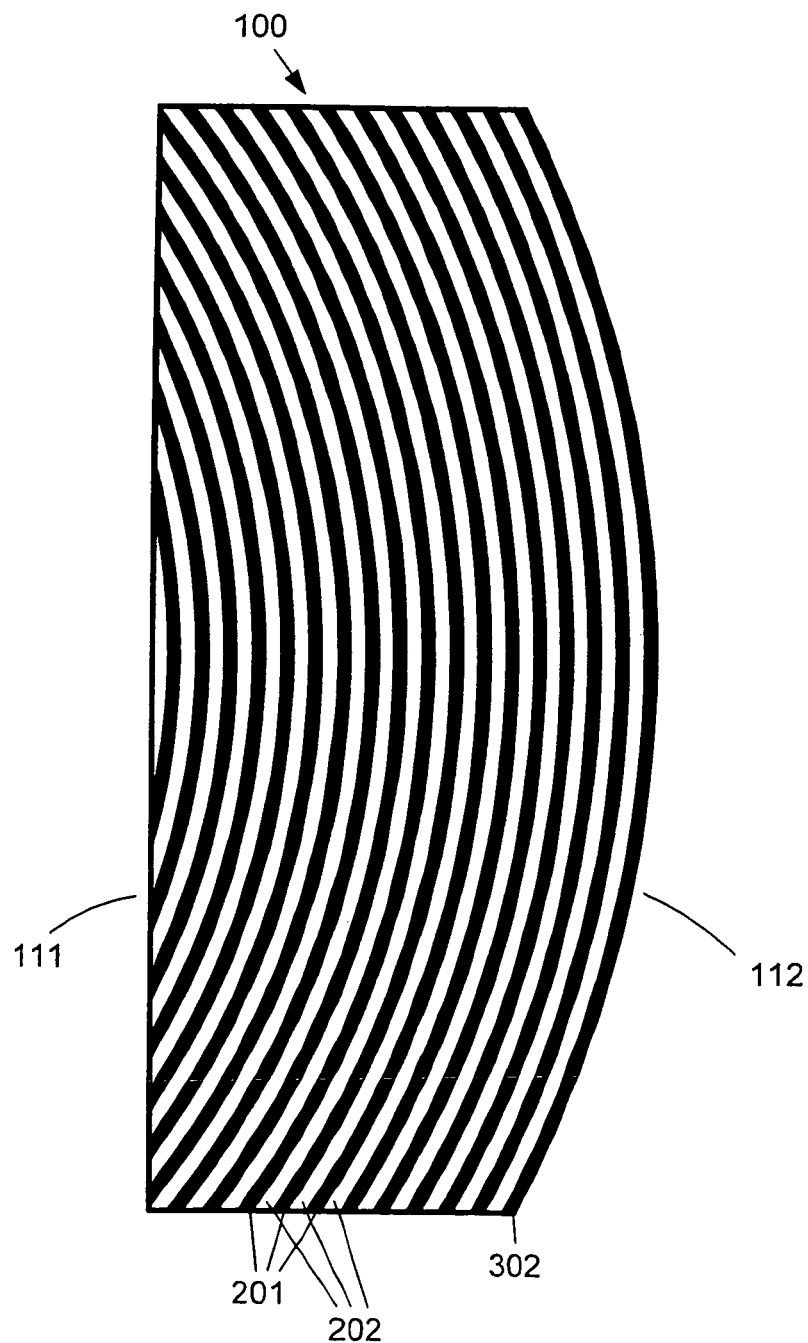
FIG. 5 depicts a layered structure as an exemplary implementation of the conversion structure of FIG. 4.
Figure 6:
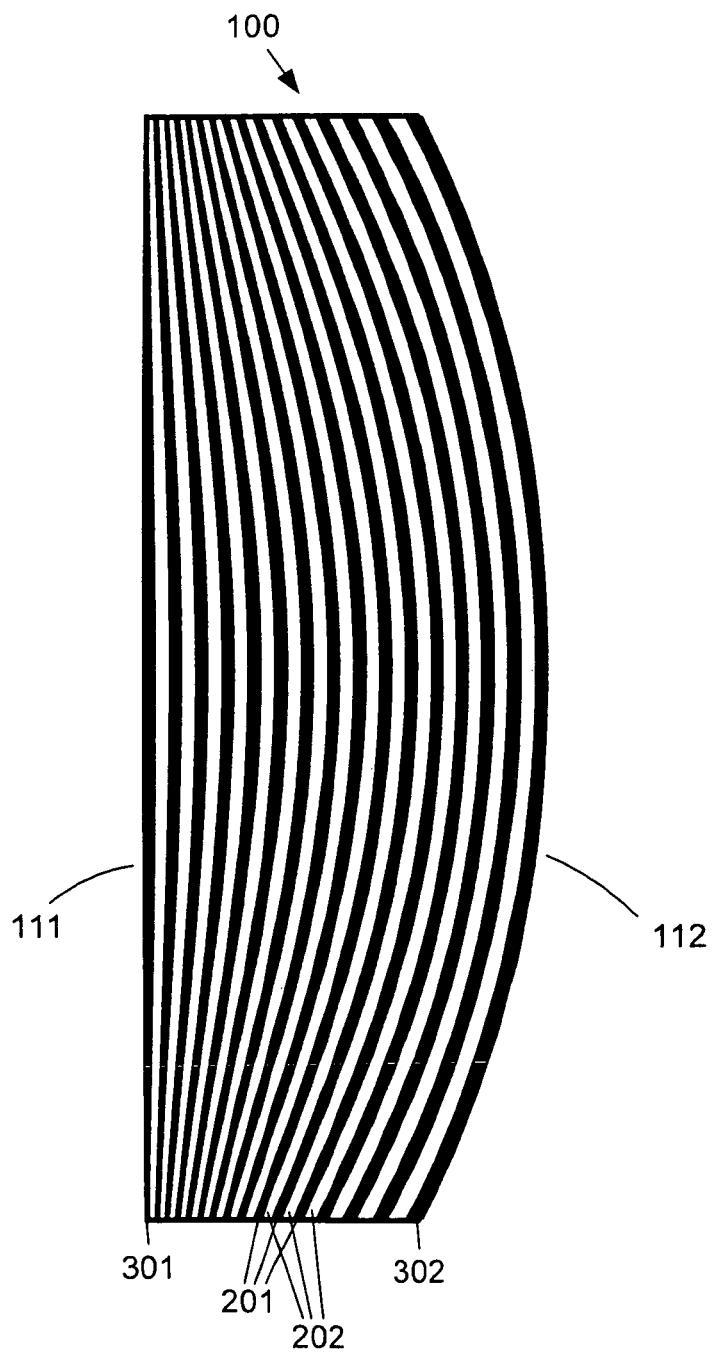
FIG. 6 depicts a layered structure as an exemplary implementation of the conversion structure of FIG. 4.

With reference now to FIGS. 5 and 6, layered structures are depicted as exemplary implementations of the conversion structure 100 of FIG. 4. In the exemplary implementations of FIGS. 5 and 6, the conversion structure 100 includes (as in FIG. 4) a first surface region 111 that is substantially planar and a second surface region 112 that substantially nonplanar; intermediate the first and second surface regions, a layered structure provides an effective continuous medium that corresponds to an indefinite medium. The layered structure includes layers of a first material 201 interleaved with layers of a second material 202, where the first and second materials have electromagnetic parameters (e.g. permittivities and/or permeabilities) that are oppositely-signed, as described previously. In the exemplary implementations of FIGS. 5 and 6, the alternating layers 201 and 202 are substantially nonplanar, having a layer normal direction that varies with position throughout the layered structure (i.e. from layer to layer and/or along the transverse extent of each layer), and this layer normal direction corresponds to the axial direction (as depicted by the vectors 150 in FIG. 4) of the provided indefinite medium (equivalently, regarding the interfaces between alternating layers 201 and 202 as equipotential surfaces of a scalar function $\Phi$, the gradient of $\Phi$ is locally parallel to the axial direction 150 as per equation (22)). In the exemplary implementation of FIG. 6, a first layer 301 of the layered structure substantially coincides with the first surface region 111, and a last layer 302 of the layered structure substantially coincides with the second surface region 112, but this is not intended to be limiting (e.g. in the exemplary implementation of FIG. 5, only the second surface region 112 substantially coincides with a layer 302 of the layered structure). The nonplanar alternating layers may have substantially uniform thickness throughout the transverse extents of the layers, as in FIG. 5; or substantially non-uniform thicknesses throughout the transverse extents of the layers, as in FIG. 6; or a combination thereof.

Figure 7:
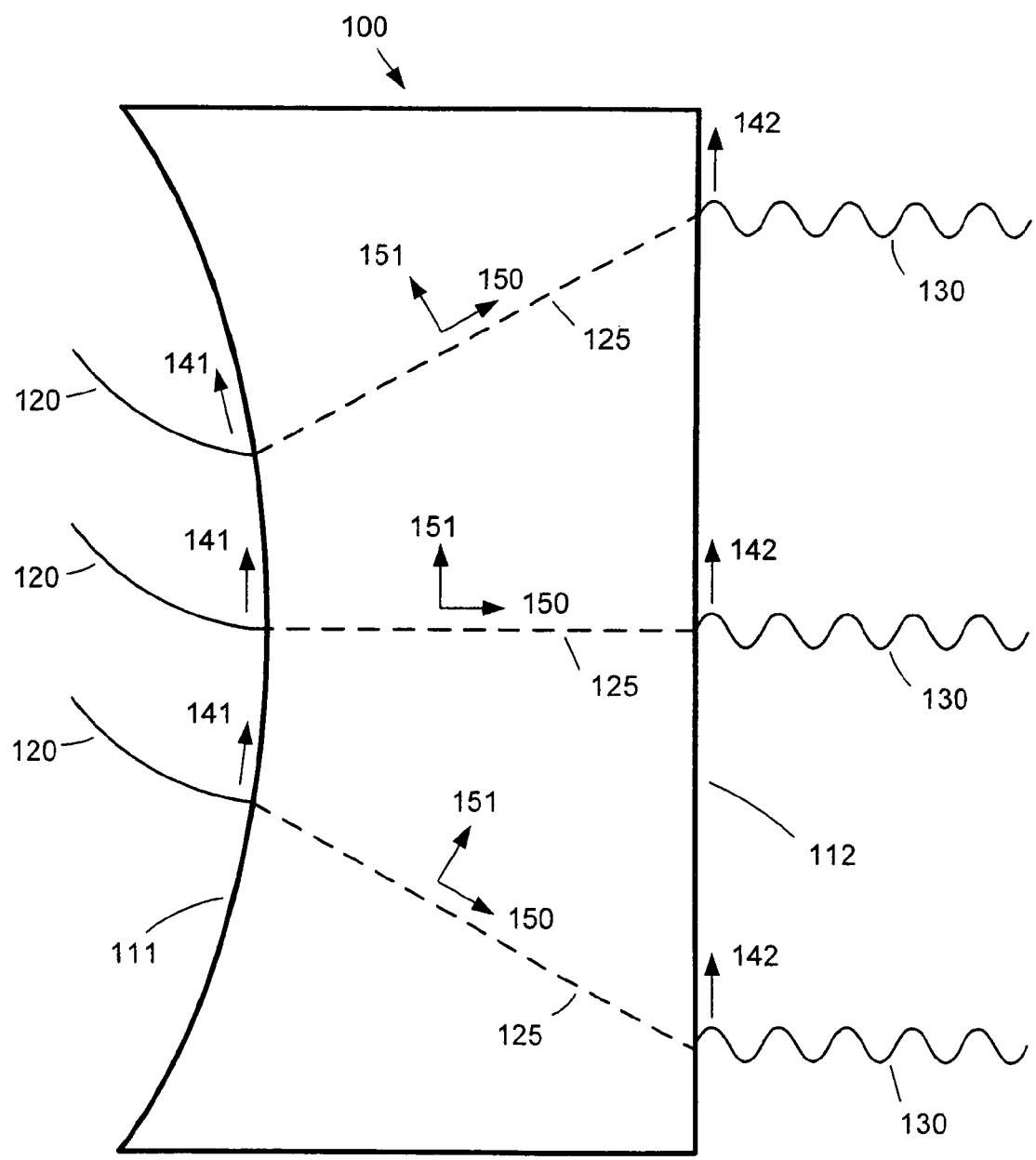
FIG. 7 depicts a conversion structure having a first surface region that is substantially nonplanar and a second surface region that is substantially planar.

With reference now to FIG. 7, an illustrative embodiment is depicted that includes a conversion structure 100 with indefinite electromagnetic parameters, the conversion structure having a first surface region 111 that is substantially nonplanar and a second surface region 112 that is substantially planar. In the illustrative embodiment, the substantially nonplanar first surface region 111 is depicted as a concave surface region (i.e. the configuration is a "concave-plano" configuration), but this is an exemplary configuration and is not intended to be limiting: other embodiments (not depicted) provide a substantially nonplanar first surface region 111 that is convex (a "convex-plano" configuration), or that includes a first subregion that is concave and a second subregion that is convex. This and other drawings, unless context dictates otherwise, can represent a planar view of a three-dimensional embodiment, or a two-dimensional embodiment (e.g. in FIG. 7 where the conversion structure is placed inside a metallic or dielectric slab waveguide oriented normal to the page). The conversion structure is responsive to an evanescent electromagnetic wave (depicted schematically as exponential tails 120) at the first surface region to convey a propagating electromagnetic wave (depicted schematically as dashed rays 125) from the first surface region to the second surface region, and to provide a non-evanescent electromagnetic wave (depicted schematically as the wavy rays 130) at the second surface region. In some embodiments the provided non-evanescent electromagnetic wave is a freely-propagating electromagnetic wave, e.g. a wave that is transmitted by and freely radiates from the second electromagnetic surface (including diverging propagating waves, converging propagating waves, and substantially planar propagating waves). In other embodiments the provided non-evanescent wave is a confinedly-propagating electromagnetic wave, e.g. a wave that is transmitted by the second electromagnetic surface into a propagating guided wave mode (as in a waveguide, transmission line, optical fiber, etc.) While the first and second surface regions 111 and 112 are depicted in FIG. 7 as exterior surfaces of the conversion structure 100, in other embodiments the first surface region and/or the second surface region may be at least partially interior to the conversion structure (e.g. where the conversion structure includes one or more of a refractive cladding, an impedance-matching layer, input or output optical components, etc.). The use of a ray description, in FIG. 7 and elsewhere, is a heuristic convenience for purposes of visual illustration, and is not intended to connote any limitations or assumptions of geometrical optics; further, the elements depicted in FIG. 7 can have spatial dimensions that are variously less than, greater than, or comparable to a wavelength of interest. At the first surface region 111, the evanescent electromagnetic wave 120 may be characterized by a first transverse wavevector $k_T^{(1)}$ (corresponding to a surface parallel direction of the first surface region indicated as the vectors 141 in FIG. 7) that exceeds a first maximum transverse wavevector $k_{max}^{(1)}$ defined as in equation (23). At the second surface region 112, the non-evanescent electromagnetic wave 130 may be characterized by a second transverse wavevector $k_T^2$ (corresponding to a surface parallel direction of the second surface region indicated as the vectors 142 in FIG. 7) that does not exceed a second maximum transverse wavevector $k_{max}^{(2)}$ defined as in equation (24).

In the illustrative embodiment of FIG. 7, the conversion structure 100 has indefinite electromagnetic parameters, i.e. the conversion structure provides an indefinite medium (i.e. an electromagnetic medium having an indefinite permittivity and/or an indefinite permeability, as discussed above) that is responsive to the evanescent electromagnetic wave 120 to convey a propagating electromagnetic wave from the first surface region 111 to the second surface region 112. The indefinite medium defines an axial direction (indicated by the vectors 150 at various positions within the indefinite medium), which, as previously discussed, corresponds to a first eigenvector of the indefinite permittivity matrix and/or the indefinite permeability matrix; and the indefinite medium further defines a transverse direction (indicated by the vectors 151 at various positions within the indefinite medium) that is perpendicular to the axial direction and corresponds to a second eigenvector of the indefinite permittivity matrix and/or the indefinite permeability matrix. In the illustrative embodiment of FIG. 7, the axial direction 150 is a non-constant axial direction that is a function of location within the conversion structure 100, i.e. the axial direction may be regarded as a vector field (a vector-valued function of location). Moreover, the axial direction is generally directed from the first surface region 111 to the second surface region 112, i.e. axial field lines corresponding to the axial direction vector field extend from the first surface region to the second surface region. In FIG. 7, the dashed rays 125, indicating the propagating electromagnetic wave, also correspond to axial field lines, because the illustrative embodiment depicts a degenerate indefinite medium, i.e. an indefinite medium, as described previously, that substantially conveys electromagnetic energy along a propagation direction that corresponds to the axial direction of the indefinite medium. (This depiction is not intended to be limiting: in other embodiments, the indefinite medium is a "non-degenerate" indefinite medium that substantially conveys electromagnetic energy along multiple propagation directions—e.g. along at least two propagation directions, each of the at least two directions having a substantially common angle with respect to the axial direction, or along a plurality of propagation directions, the plurality of propagation directions substantially composing a cone having a cone axis that substantially coincides with the axial direction.)

Referring again to FIG. 7, the propagating electromagnetic field 125 may be characterized by a transverse wavevector $k_T$ that corresponds to the transverse direction 151. In the present example, the axial field lines (corresponding to the vector field that describes the axial direction 150) diverge geometrically as they proceed from the first surface region 111 to the second surface region 112, and this geometric divergence may provide a substantially continuous variation of the transverse wavevector $k_T$, from a first transverse wavevector $k_T^{(1)}$ at the first surface region (as in equation (23), to match the transverse wavevector of the evanescent electromagnetic wave 120) to a second transverse wavevector $k_T^{(2)}$ at the second surface region (as in equation (24), to match the transverse wavevector of the non-evanescent electromagnetic wave 130). Thus, the geometric divergence of the axial field lines admits the conversion of an evanescent electromagnetic wave 120 to a non-evanescent electromagnetic wave 130, by supporting a propagating electromagnetic wave 125 having a substantially continuous variation of transverse wavevector from an initial transverse wavevector that exceeds a maximum wavevector for non-evanescent waves to a final transverse wavevector that does not exceed a maximum wavevector for non-evanescent waves.

Figure 8:
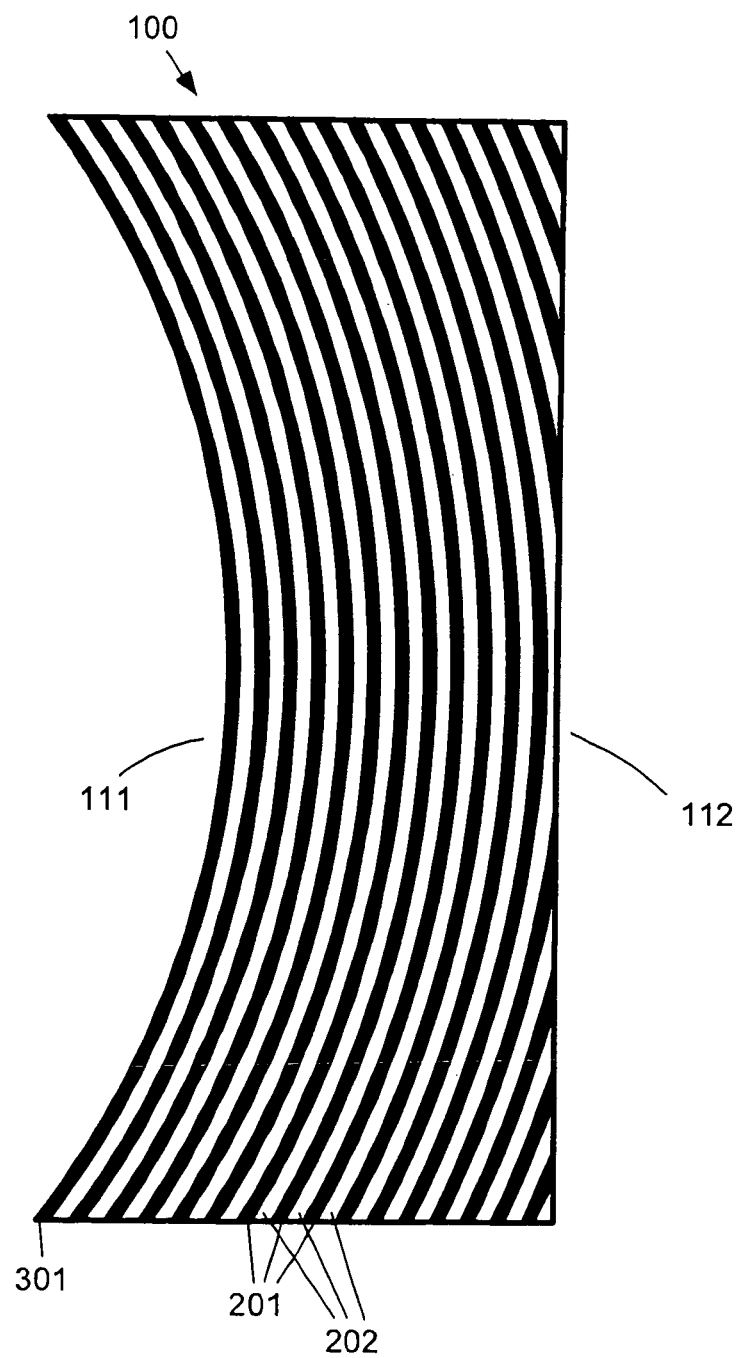
FIG. 8 depicts a layered structure as an exemplary implementation of the conversion structure of FIG. 7.
Figure 9:
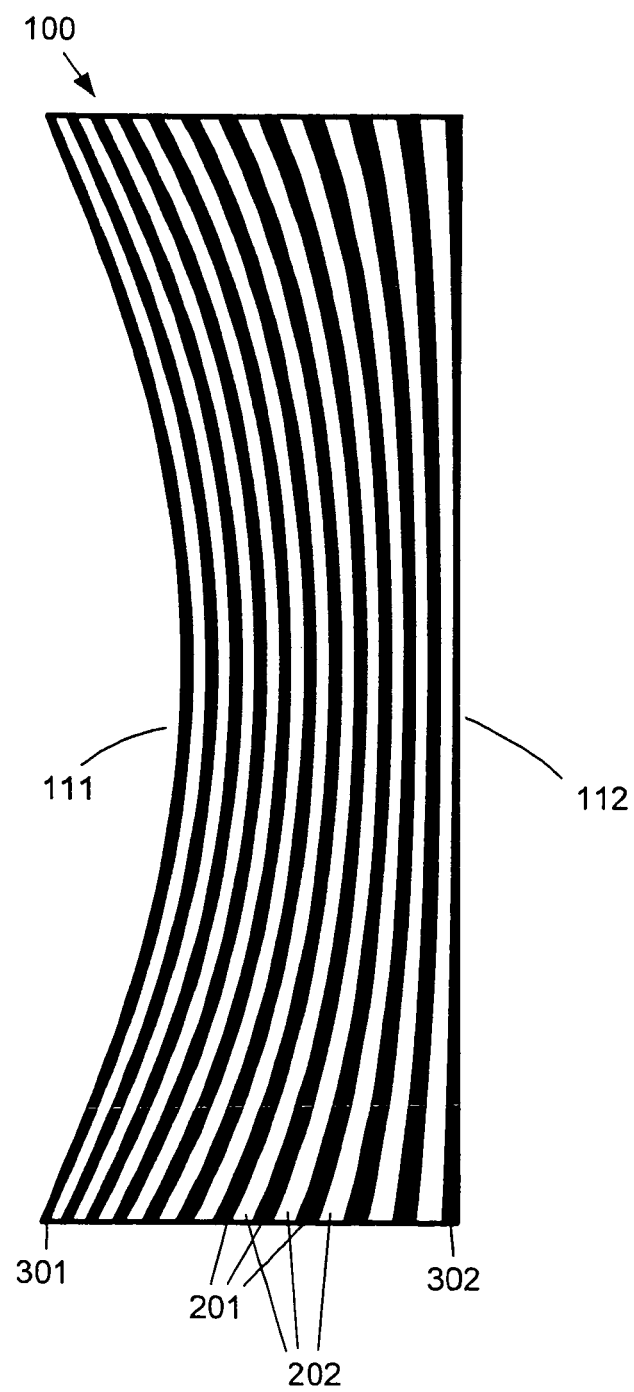
FIG. 9 depicts a layered structure as an exemplary implementation of the conversion structure of FIG. 7.

With reference now to FIGS. 8 and 9, layered structures are depicted as exemplary implementations of the conversion structure 100 of FIG. 7. In the exemplary implementations of FIGS. 8 and 8, the conversion structure 100 includes (as in FIG. 7) a first surface region 111 that is substantially nonplanar and a second surface region 112 that substantially planar; intermediate the first and second surface regions, a layered structure provides an effective continuous medium that corresponds to an indefinite medium. The layered structure includes layers of a first material 201 interleaved with layers of a second material 202, where the first and second materials have electromagnetic parameters (e.g. permittivities and/or permeabilities) that are oppositely-signed, as described previously. In the exemplary implementations of FIGS. 8 and 9, the alternating layers 201 and 202 are substantially nonplanar, having a layer normal direction that varies with position throughout the layered structure (i.e. from layer to layer and/or along the transverse extent of each layer), and this layer normal direction corresponds to the axial direction (as depicted by the vectors 150 in FIG. 7) of the provided indefinite medium (equivalently, regarding the interfaces between alternating layers 201 and 202 as equipotential surfaces of a scalar function Φ, the gradient of Φ is locally parallel to the axial direction 150 as per equation (22)). In the exemplary implementation of FIG. 9, a first layer 301 of the layered structure substantially coincides with the first surface region 111, and a last layer 302 of the layered structure substantially coincides with the second surface region 112, but this is not intended to be limiting (e.g. in the exemplary implementation of FIG. 8, only the first surface region 112 substantially coincides with a layer 301 of the layered structure). The nonplanar alternating layers may have substantially uniform thickness throughout the transverse extents of the layers, as in FIG. 8; or substantially non-uniform thicknesses throughout the transverse extents of the layers, as in FIG. 9; or a combination thereof.

With reference now to FIG. 10, various illustrative embodiments are depicted that include a conversion structure 100 with indefinite electromagnetic parameters, the conversion structure having a first surface region 111 and a second surface region 112, the first surface region and the second surface region being substantially nonplanar and substantially non-concentric. In general, a first surface region and a second surface region are non-concentric if: the first surface region has a non-constant curvature, and/or the second surface region has a non-constant curvature, and/or a center of an osculating circle of the first surface region is different than a center of an osculating circle of the second surface region (where the osculating circles are coplanar). Embodiment 1001 depicts a conversion structure 100 having a first surface region 111 and a second surface region 112 that are both convex (a "bi-convex" configuration). Embodiment 1002 depicts a conversion structure 100 having a first surface region 111 and a second surface region 112 that are both concave (a "bi-concave" configuration). Embodiment 1003 depicts a conversion structure 100 having a first surface region 111 that is concave and a second surface region 112 that is convex, where a center of curvature of the first surface region is to the right of—i.e. nearer to the conversion structure than—a center of curvature of the second surface region, i.e. a concave-convex "negative meniscus" configuration (another exemplary embodiment—not shown—provides a concave-convex "positive meniscus" configuration where the center of curvature of the first surface region is to the left—i.e. farther from the conversion structure than—the center of curvature of the second surface region). Embodiment 1004 depicts a conversion structure 100 having a first surface region 111 that is convex and a second surface region 112 that is concave, where a center of curvature of the first surface region is to the left of—i.e. nearer to the conversion structure than—a center of curvature of the second surface region, i.e. a convex-concave "positive meniscus" configuration (another exemplary embodiment—not shown—provides a convex-concave "negative meniscus" configuration where the center of curvature of the first surface region is to the right of—i.e. farther from the conversion structure than—the center of curvature of the second surface region). Embodiment 1005 depicts a conversion structure having a first surface region 111 that is partially convex and partially concave and a second surface region 112 that is partially convex and partially concave (in other embodiments, not shown, the first surface region 111 is convex only or concave only and the second surface region 112 is partially convex and partially concave, or the first surface region 111 is partially convex and partially concave and the second surface region 112 is convex only or concave only). As elsewhere, the depictions in FIG. 10 can represent planar views of three-dimensional embodiments, or a two-dimensional embodiment (e.g. where the conversion structure 100 is placed inside a metallic or dielectric slab waveguide oriented normal to the page).

In each embodiment of FIG. 10, the conversion structure 100 is responsive to an evanescent electromagnetic wave (depicted schematically as exponential tails 120) at the first surface region 111 to convey a propagating electromagnetic wave (depicted schematically as dashed rays 125) from the first surface region to the second surface region, and to provide a non-evanescent electromagnetic wave (depicted schematically as the wavy rays 130) at the second surface region 112. In some applications the provided non-evanescent electromagnetic wave is a freely-propagating electromagnetic wave, e.g. a wave that is transmitted by and freely radiates from the second electromagnetic surface (including diverging propagating waves, converging propagating waves, and substantially planar propagating waves). In other applications the provided non-evanescent wave is a confinedly-propagating electromagnetic wave, e.g. a wave that is transmitted by the second electromagnetic surface into a propagating guided wave mode (as in a waveguide, transmission line, optical fiber, etc.) While the first and second surface regions 111 and 112 are depicted in FIG. 10 as exterior surfaces of the conversion structure 100, in other embodiments the first surface region and/or the second surface region may be at least partially interior to the conversion structure (e.g. where the conversion structure includes one or more of a refractive cladding, an impedance-matching layer, input or output optical components, etc.). The use of a ray description, in FIG. 10 and elsewhere, is a heuristic convenience for purposes of visual illustration, and is not intended to connote any limitations or assumptions of geometrical optics; further, the elements depicted in FIG. 10 can have spatial dimensions that are variously less than, greater than, or comparable to a wavelength of interest. At the first surface region 111, the evanescent electromagnetic wave 120 may be characterized by a first transverse wavevector $k_T^{(1)}$ (corresponding to a surface parallel direction of the first surface region—for simplicity this surface parallel direction of the first surface region is not depicted in the embodiments of FIG. 10, but should be apparent from the analogous elements 141 depicted in FIGS. 1, 4, and 7) that exceeds a first maximum transverse wavevector $k_{max}^{(1)}$ defined as in equation (23). At the second surface region 112, the non-evanescent electromagnetic wave 130 may be characterized by a second transverse wavevector $k_T^{(2)}$ (corresponding to a surface parallel direction of the second surface region—again for simplicity this surface parallel direction of the second surface region is not depicted in the embodiments of FIG. 10, but should be apparent from the analogous elements 142 depicted in FIGS. 1, 4, and 7) that does not exceed a second maximum transverse wavevector $k_{max}^{(2)}$ defined as in equation (24).

In the illustrative embodiments of FIG. 10, the conversion structure 100 has indefinite electromagnetic parameters, i.e. the conversion structure provides an indefinite medium (i.e. an electromagnetic medium having an indefinite permittivity and/or an indefinite permeability, as discussed above) that is responsive to the evanescent electromagnetic wave 120 to convey a propagating electromagnetic wave from the first surface region 111 to the second surface region 112. The indefinite medium defines an axial direction (again for simplicity this axial direction is not depicted in the embodiments of FIG. 10, but should be apparent from the analogous elements 150 depicted in FIGS. 1, 4, and 7), which, as previously discussed, corresponds to a first eigenvector of the indefinite permittivity matrix and/or the indefinite permeability matrix; and the indefinite medium further defines a transverse direction (again for simplicity this transverse direction is not depicted in the embodiments of FIG. 10, but should be apparent from the analogous elements 151 depicted in FIGS. 1, 4, and 7) that is perpendicular to the axial direction and corresponds to a second eigenvector of the indefinite permittivity matrix and/or the indefinite permeability matrix. In the illustrative embodiments of FIG. 10, the axial direction 150 is a non-constant axial direction that is a function of location within the conversion structure 100, i.e. the axial direction may be regarded as a vector field (a vector-valued function of location). Moreover, the axial direction is generally directed from the first surface region 111 to the second surface region 112, i.e. axial field lines corresponding to the axial direction vector field extend from the first surface region to the second surface region. In FIG. 1, the dashed rays 125, indicating the propagating electromagnetic wave, also correspond to axial field lines, because the illustrative embodiment depicts a degenerate indefinite medium, i.e. an indefinite medium, as described previously, that substantially conveys electromagnetic energy along a propagation direction that corresponds to the axial direction of the indefinite medium. (This depiction is not intended to be limiting: in other embodiments, the indefinite medium is a "non-degenerate" indefinite medium that substantially conveys electromagnetic energy along multiple propagation directions—e.g. along at least two propagation directions, each of the at least two directions having a substantially common angle with respect to the axial direction, or along a plurality of propagation directions, the plurality of propagation directions substantially composing a cone having a cone axis that substantially coincides with the axial direction.)

Referring again to FIG. 10, the propagating electromagnetic field 125 may be characterized by a transverse wavevector $k_T$ that corresponds to the transverse direction (again for simplicity this transverse direction is not depicted in the embodiments of FIG. 10, but should be apparent from the analogous elements 151 depicted in FIGS. 1, 4, and 7). In the present example, the axial field lines (corresponding to the vector field that describes the axial direction) diverge geometrically as they proceed from the first surface region 111 to the second surface region 112, and this geometric divergence may provide a substantially continuous variation of the transverse wavevector $k_T$, from a first transverse wavevector $k_T^{(1)}$ at the first surface region (as in equation (23), to match the transverse wavevector of the evanescent electromagnetic wave 120) to a second transverse wavevector $k_T^{(2)}$ at the second surface region (as in equation (24), to match the transverse wavevector of the non-evanescent electromagnetic wave 130). Thus, the geometric divergence of the axial field lines admits the conversion of an evanescent electromagnetic wave 120 to a non-evanescent electromagnetic wave 130, by supporting a propagating electromagnetic wave 125 having a substantially continuous variation of transverse wavevector from an initial transverse wavevector that exceeds a maximum wavevector for non-evanescent waves to a final transverse wavevector that does not exceed a maximum wavevector for non-evanescent waves.

Figure 11:
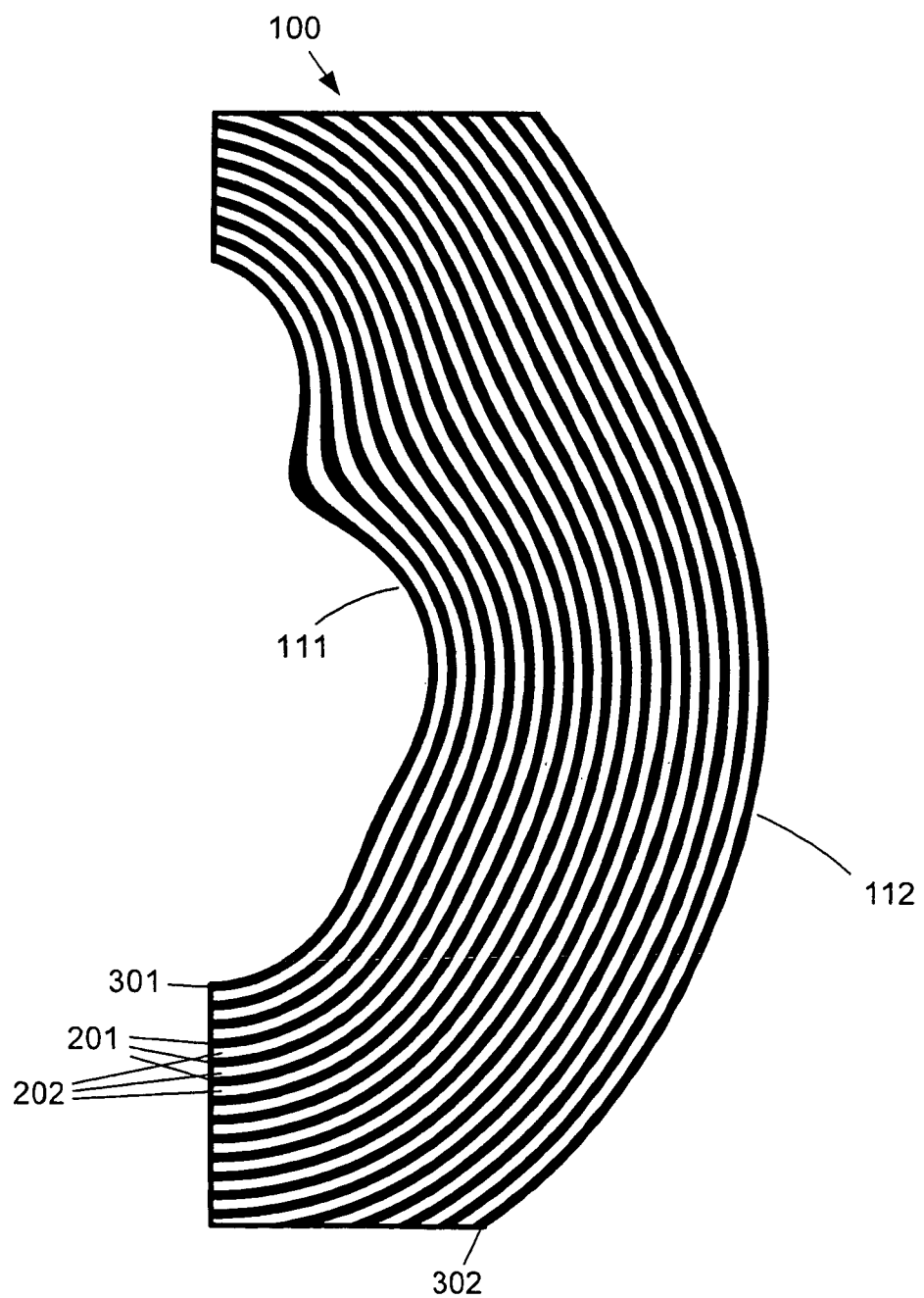
FIG. 11 depicts a layered structure as an exemplary implementation of a conversion structure as in FIG. 10.

With reference now to FIG. 11, a layered structure is depicted as an exemplary implementation of a conversion structure 100 as in FIG. 10. In the exemplary implementation of FIG. 11, the conversion structure 100 includes a first surface region 111 and a second surface region 112 that are substantially nonplanar and substantially non-concentric; intermediate the first and second surface regions, a layered structure provides an effective continuous medium that corresponds to an indefinite medium. The layered structure includes layers of a first material 201 interleaved with layers of a second material 202, where the first and second materials have electromagnetic parameters (e.g. permittivities and/or permeabilities) that are oppositely-signed, as described previously. In the exemplary implementations of FIG. 11, the alternating layers 201 and 202 are substantially nonplanar, having a layer normal direction that varies with position throughout the layered structure (i.e. from layer to layer and/or along the transverse extent of each layer), and this layer normal direction corresponds to the axial direction of the provided indefinite medium (equivalently, regarding the interfaces between alternating layers 201 and 202 as equipotential surfaces of a scalar function Φ, the gradient of Φ is locally parallel to the axial direction as per equation (22)). In the exemplary implementation of FIG. 3, a first layer 301 of the layered structure substantially coincides with the first surface region 111, and a last layer 302 of the layered structure substantially coincides with the second surface region 112, but this is not intended to be limiting (in other embodiments, not depicted, the first surface region 111 does not coincide with a layer of the layered structure, and/or the second surface region 112 does not coincide with a layer of the layered structure). The nonplanar alternating layers may have substantially uniform thickness throughout the transverse extents of the layers; or substantially non-uniform thicknesses throughout the transverse extents of the layers; or a combination thereof, as in FIG. 11.

In some embodiments a conversion structure, such as those depicted in FIGS. 1-11, includes an indefinite transformation medium, i.e. a transformation medium that has indefinite electromagnetic parameters. For example, the geometric divergence of the axial field lines, along the dashed rays 125 in FIGS. 1, 4, 7, and 10, may accord with a coordinate transformation, e.g. from an untransformed coordinate space in which the axial field lines do not have a geometric divergence. Recalling the previous exemplary planar slab of indefinite medium (i.e. as described by equations (3), (5), (9), and/or (11) and the text accompanying these equations), the planar slab has an axial direction that corresponds to the z-axis; thus, axial field lines for the planar slab are straight lines parallel to the z-axis and perpendicular to the faces of the slab (for purposes of illustration, suppose that the faces of the slab—its first and second surface regions—are located at z=0 and z=d, respectively). To obtain an indefinite transformation medium, suppose that this planar slab is regarded as the original untransformed medium in equations (15) and (16), and consider an exemplary coordinate transformation that maps a portion of the surface z=0 to the first surface region 111 of the conversion structure 100, and a portion of the surface z=d to the second surface region 112 of the conversion structure 100, with portions of the intermediate surfaces of constant z (i.e. for 0<z<d) mapped to successive surfaces $S_z$ in the transformed coordinate space, so that the family of successive surfaces $\{S_z | 0<z<d\}$ spans a region intermediate the first surface region and the second surface region in the transformed coordinate space. Further, suppose that the exemplary coordinate transformation provides an increasing magnification of the successive constant-z surfaces according to a magnification factor m(z) so that, for example, two lines that are parallel to the z-axis in the untransformed coordinate space shall diverge in the transformed coordinate space, with a geodesic distance between the two lines being proportional to m(z) on the surface $S_z$. For the conversion structure 100 of FIG. 1, having first and second surface regions 111 and 112 that are substantially parallel and substantially planar, an exemplary coordinate transformation maps planes of constant z to planes of constant z' according to the equations $$x'=m(z)x$$
$$y'=m(z)y \qquad (25)$$
$$z'=z$$

where m(z) is a magnification factor that increases with z (e.g. from m=1 at the first surface region to m=M>1 at the second surface region). In this example, the first and second surface regions of the indefinite transformation medium, at z'=0 and z'=d, respectively, correspond to the first and second surface regions 111 and 112 of the conversion structure 100 in FIG. 1. Constitutive parameters of the indefinite transformation medium (obtained from equations (15) and (16) with the Jacobian matrix (17) corresponding to coordinate transformation (25)) provide an indefinite medium with axial field lines that diverge geometrically as they proceed from the first surface region to the second surface region, in accordance with the magnifying coordinate transformation (25). Then, for a propagating electromagnetic wave 125 characterized by a transverse wavevector $k_T$, the transverse wavevector varies in inverse proportion to the magnification factor m(z') as the propagating electromagnetic wave advances from the first surface region 111 to the second surface region 112, implying the connection $$\frac{k_T^{(1)}}{k_T^{(2)}} = \frac{m(z'=d)}{m(z'=0)} = M \tag{26}$$

between the first transverse wavevector $k_T^{(1)}$ for the evanescent electromagnetic wave 120 (at the first surface region) and the second transverse wavevector $k_T^{(2)}$ for the non-evanescent electromagnetic wave 130 (at the second surface region). Therefore the conversion structure 100 will convert an evanescent electromagnetic wave 120 to a non-evanescent electromagnetic wave 130 for a range of transverse wavevectors $k_T^{(1)} \in (k_{max}^{(1)}, M k_{max}^{(2)})$ (cf. equations (23) and (24)); or, reciprocally, the conversion structure 100 will convert a non-evanescent electromagnetic wave 130 to an evanescent electromagnetic wave 120 for a range of transverse wavevectors $k_T^{(2)} \in (M^{-1} k_{max}^{(1)}, k_{max}^{(2)})$.

In some embodiments, the planar slab of untransformed indefinite medium is a degenerate indefinite medium, i.e. providing degenerate propagation for TM-polarized waves (with $|\epsilon_x|$ and/or $|\epsilon_y|$ substantially less than $|\epsilon_z|$), TE-polarized waves (with $|\mu_x|$ and/or $|\mu_y|$ substantially less than $|\mu_z|$), or both. For example, the planar slab may have a permittivity matrix $$\epsilon = \begin{pmatrix} \epsilon_x & 0 & 0 \\ 0 & \epsilon_y & 0 \\ 0 & 0 & \epsilon_z \end{pmatrix} \approx \begin{pmatrix} 0 & 0 & 0 \\ 0 & 0 & 0 \\ 0 & 0 & \epsilon_z \end{pmatrix} \tag{27}$$

(where the symbol "≈" indicates that the transverse components are approximated as zero). In the transformed coordinate space, the new permittivity tensor is $$\tilde{\epsilon}^{i'j'} \approx |\det(\Lambda)|^{-1} \Lambda_z^{i'} \Lambda_z^{j'} \epsilon_z \tag{28}$$

which may be diagonalized in the new coordinate space as $$\tilde{\epsilon} \approx \frac{\epsilon_z}{|\det(\Lambda)|} \begin{pmatrix} 0 & 0 & 0 \\ 0 & 0 & 0 \\ 0 & 0 & \sum_{i'} \Lambda_z^{i'} \Lambda_z^{i'} \end{pmatrix}. \tag{29}$$

The transformation medium is a new degenerate indefinite medium, with a new spatially-varying axial direction given by $$u_A \propto \left( \frac{\partial x'}{\partial z}, \frac{\partial y'}{\partial z}, \frac{\partial z'}{\partial z} \right) \propto \left( x', y', \frac{m(z')}{m'(z')} \right) \tag{30}$$

(in the coordinate basis (x',y',z')), where the latter proportionality is obtained by substituting equation (25). In some embodiments this transformation medium may be implemented as a nonplanar layered structure (cf. the preceding discussion of layered structures), by relating the vector field (30) to a scalar potential $\Phi$ according to equation (22) whereby the interfaces of adjacent layers in the nonplanar layered structure correspond to equipotential surfaces of the function $\Phi$. In a first example, the magnification factor may increase linearly with z, e.g.

$$m(z) = 1 + (M-1)\frac{z}{d}; \tag{31}$$

the resultant axial vector field (30) corresponds to a scalar potential $\Phi$ having equipotential surfaces that are concentric spheres (or cylinders, in a two-dimensional embodiment) centered at z'=−d/(M−1). The layered structure of FIG. 2 resembles a configuration of this sort; moreover the layered structures of FIGS. 5 and 8 resemble the configuration of FIG. 2, absent selected layers so as to have either a nonplanar first surface region or a nonplanar second surface region of the conversion structure, but providing similar indefinite medium properties within the interior of the conversion structure. In a second example, the magnification factor may increase non-linearly with z, e.g.

$$m(z) = 1 + \frac{M-1}{2}\left(1 - \cos\frac{\pi z}{d}\right) \tag{32}$$

(the functional dependence being selected to have m'(0)=m' (d)=0); the resultant axial vector field (30) corresponds to a scalar potential $\Phi$ having successive equipotential surfaces that evolve from a planar surface at z'=0 through a series of curved surfaces to another planar surface at z'=d. The layered structure of FIG. 3 resembles a configuration of this sort; moreover the layered structures of FIGS. 6 and 9 resemble the configuration of FIG. 3, absent selected layers so as to have either a nonplanar first surface region or a nonplanar second surface region of the conversion structure, but providing similar indefinite medium properties within the interior of the conversion structure.

The exemplary conversion structures 100 in FIGS. 1, 4, 7, and 10 provide an indefinite medium that is depicted as responding to an evanescent electromagnetic wave to provide a non-evanescent electromagnetic wave. In some embodiments (e.g. where the indefinite medium is a reciprocal electromagnetic medium) the indefinite medium alternately or additionally has a reciprocal response, i.e. the indefinite medium responds to a non-evanescent electromagnetic wave to provide an evanescent electromagnetic wave. In a reciprocal response of a conversion structure 100 as in FIGS. 1, 4, 7, and 10, the non-evanescent electromagnetic wave 130 and the propagating electromagnetic wave 125 may be regarded as having spatially-reversed propagation directions (i.e. propagating from right to left in the figures) and the evanescent electromagnetic wave 120 may be regarded as having a spatially-reversed exponential decay (i.e. having an exponential decay from right to left, rather than from left to right as depicted). Thus, in a reciprocal scenario, the conversion structure 100 is responsive to a (leftwards-propagating) non-evanescent electromagnetic wave 130 at the second surface region 112 to convey a propagating electromagnetic wave 125 from the second surface region to the first surface region 111 and to provide an (leftwards-decaying) evanescent electromagnetic wave 120 at the first surface region. As before, the evanescent electromagnetic wave 120 may be characterized by a first transverse wavevector $k_T^{(1)}$ as in equation (23) and the non-evanescent electromagnetic wave 130 may be characterized by a second transverse wavevector $k_T^{(2)}$ as in equation (24). In the reciprocal scenario, when the indefinite medium is a degenerate indefinite medium, the propagating electromagnetic wave 125 may propagate along a propagation direction that corresponds to a direction antiparallel to the axial direction of the indefinite medium; when the indefinite medium is a non-degenerate indefinite medium, the propagating electromagnetic wave 125 may propagate along multiple propagation directions—e.g. along at least two propagation directions, each of the at least two directions having a substantially common angle with respect to a direction antiparallel to the axial direction, or along a plurality of propagation directions, the plurality of propagation directions substantially composing a cone axis that substantially coincides with a direction antiparallel to the axial direction. In the depictions of FIGS. 1, 4, 7, and 10, the axial field lines diverge geometrically as they proceed from the first surface region 111 to the second surface region 112; equivalently, the axial field lines converge geometrically from the second surface 112 to the first surface 111. In the reciprocal scenario, this geometric convergence may provide—for a propagating electromagnetic wave 125 characterized by a transverse wavevector $k_T$—a substantially continuous variation of the transverse wavevector $k_T$ from $k_T^{(2)}$ at the second surface region (as in equation (24), to match the transverse wavevector of the non-evanescent electromagnetic wave 130) to $k_T^{(1)}$ at the first surface region (as in equation (23), to match the transverse wavevector of the evanescent electromagnetic wave 120). Thus, the geometric convergence of the axial field lines admits the conversion of a non-evanescent electromagnetic wave 130 to an evanescent electromagnetic wave 120, by supporting a propagating electromagnetic wave having a substantially continuous variation of transverse wavevector from an initial transverse wavevector that does not exceed a maximum wavevector for non-evanescent waves to a final transverse wavevector that exceeds a maximum wavevector for non-evanescent waves.

Some embodiments are responsive to an evanescent electromagnetic wave to provide a non-evanescent electromagnetic wave (and/or vice versa, in a reciprocal scenario) at a selected frequency/frequency band and/or a selected polarization. The selected frequency or frequency band may be selected from a range that includes radio frequencies, microwave frequencies, millimeter- or submillimeter-wave frequencies, THz-wave frequencies, optical frequencies (e.g. variously corresponding to soft x-rays, extreme ultraviolet, ultraviolet, visible, near-infrared, infrared, or far infrared light), etc. The selected polarization may be a TE polarization, a TM polarization, a circular polarization, etc. (other embodiments are responsive to an evanescent electromagnetic wave to provide a non-evanescent electromagnetic wave—and/or vice versa, in a reciprocal scenario—for any polarization, e.g. for unpolarized electromagnetic energy).

Some embodiments are responsive to an evanescent electromagnetic wave to a provide a non-evanescent electromagnetic wave (and/or vice versa, in a reciprocal scenario) at a first frequency, and further responsive to an evanescent electromagnetic wave to a provide a non-evanescent electromagnetic wave (and/or vice versa, in a reciprocal scenario) at a second frequency different than the first frequency. For embodiments that recite first and second frequencies, the first and second frequencies may be selected from the frequency categories in the preceding paragraph. Moreover, for these embodiments, the recitation of first and second frequencies may generally be replaced by a recitation of first and second frequency bands, again selected from the above frequency categories. These embodiments responsive at first and second frequencies may include a indefinite medium having adjustable electromagnetic properties. For example, the indefinite medium may have electromagnetic properties that are adjustable (e.g. in response to an external input or control signal) between first electromagnetic properties and second electromagnetic properties, the first electromagnetic properties providing an indefinite medium responsive to an evanescent electromagnetic wave to provide a non-evanescent electromagnetic wave (and/or vice versa) at the first frequency, and the second electromagnetic properties providing an indefinite medium responsive to an evanescent electromagnetic wave to provide a non-evanescent electromagnetic wave (and/or vice versa) at the second frequency. An indefinite medium with an adjustable electromagnetic response may be implemented with variable metamaterials, e.g. as described in R. A. Hyde et al, supra. Other embodiments responsive at first and second frequencies may include an indefinite medium having a frequency-dependent response to electromagnetic radiation, corresponding to frequency-dependent constitutive parameters. For example, the frequency-dependent response at a first frequency may be a response to an evanescent electromagnetic wave to provide a non-evanescent electromagnetic wave (and/or vice versa) at the first frequency, and the frequency-dependent response at a second frequency may be a response to an evanescent electromagnetic wave to provide a non-evanescent electromagnetic wave (and/or vice versa) at the second frequency. An indefinite medium having a frequency-dependent response to electromagnetic radiation can be implemented with artificially-structured materials such as metamaterials; for example, a first set of metamaterial elements having a response at the first frequency may be interleaved with a second set of metamaterial elements having a response at the second frequency.

Figure 12:
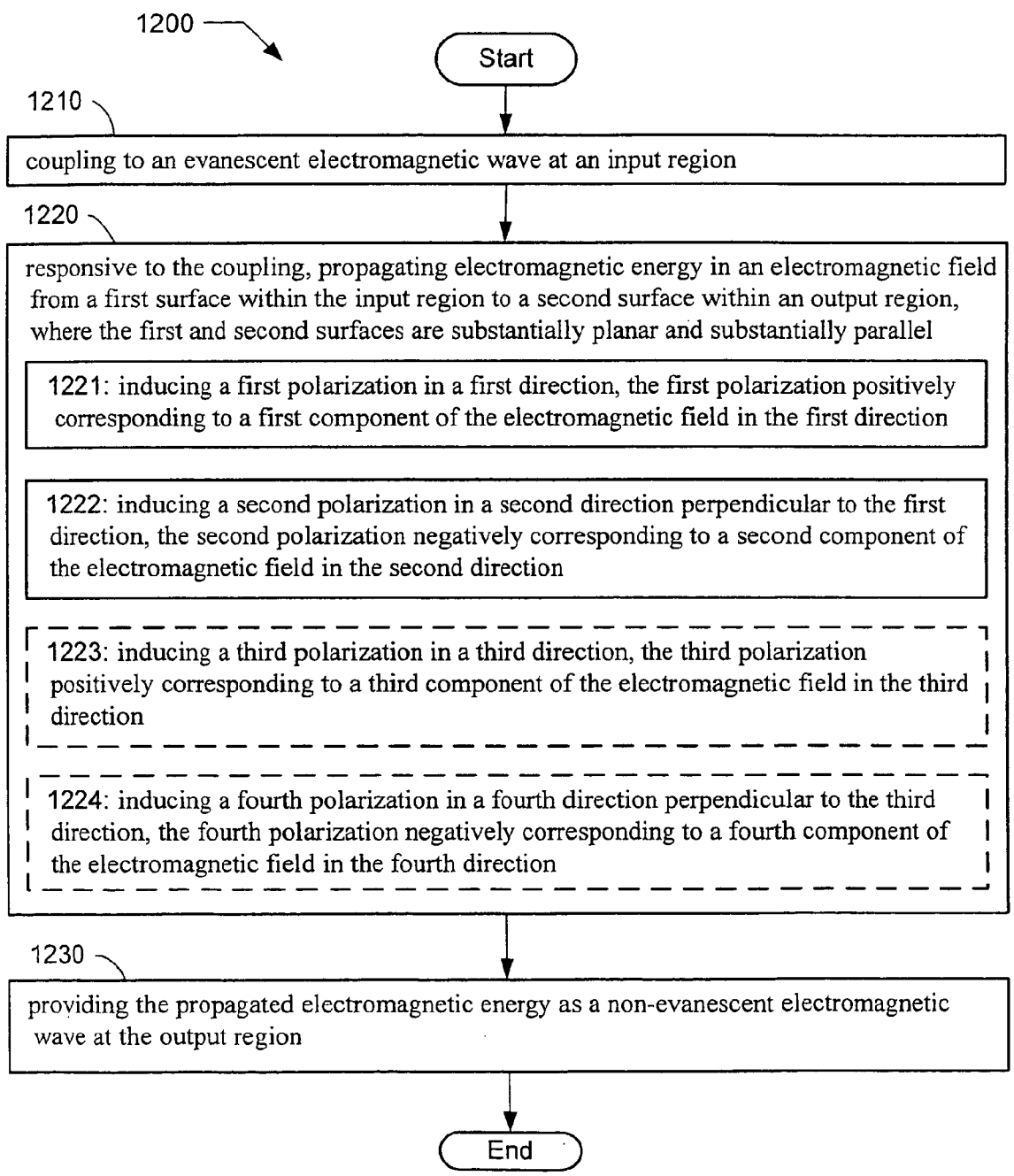
FIG. 12 depicts a first process flow.

An illustrative embodiments is depicted as a process flow diagram in FIG. 12. Flow 1200 includes operation 1210—coupling to an evanescent electromagnetic wave at an input region. For example, a conversion structure, such as that depicted as element 100 in FIG. 1, couples to an evanescent electromagnetic wave 120 at a first surface region 111 of the conversion structure. Flow 1200 includes operation 1220—responsive to the coupling, propagating electromagnetic energy in an electromagnetic field from a first surface within the input region to a second surface within an output region, where the first and second surfaces are substantially planar and substantially parallel. For example, the conversion structure 100 in FIG. 1 conveys a propagating electromagnetic wave 125 from the first surface region 111 to the second surface region 112. The first surface may be an exterior surface of the input region, or at least partially within an interior portion of the input region (e.g. corresponding to a conversion structure having an input surface region 111 that is at least partially interior to the conversion structure). The second surface may be an exterior surface of the output region, or at least partially within an interior portion of the output region (e.g. corresponding to a conversion structure having an output surface region 112 that is at least partially interior to the conversion structure). Operation 1220 includes sub-operation

1221—inducing a first polarization in a first direction, the first polarization positively corresponding to a first component of the electromagnetic field in the first direction—and sub-operation 1222—inducing a second polarization in a second direction perpendicular to the first direction, the second polarization negatively corresponding to a second component of the electromagnetic field in the second direction. For example, a conversion structure 100 as in FIG. 1 may provide an indefinite medium having an indefinite permittivity, and the indefinite permittivity may correspond to an electric susceptibility that is positive in a first direction and negative in a second direction (where the first and second directions may correspond to the axial and transverse directions 150 and 151 in FIG. 1, or vice versa). Then the propagating electromagnetic wave 125 may induce an electric polarization in the first direction that positively corresponds (in accordance with the positive electric susceptibility) to an electric field component of the propagating electromagnetic wave in the first direction, and further induce an electric polarization in the second direction that negatively corresponds (in accordance with the negative electric susceptibility) to an electric field component of the propagating electromagnetic wave in the second direction. In an alternate example, a conversion structure 100 as in FIG. 1 may provide an indefinite medium having an indefinite permeability, and the indefinite permeability may correspond to a magnetic susceptibility that is positive in a first direction and negative in a second direction (where the first and second directions may correspond to the axial and transverse directions 150 and 151 in FIG. 1, or vice versa). Then the propagating electromagnetic wave 125 may induce a magnetic polarization in the first direction that positively corresponds (in accordance with the positive magnetic susceptibility) to a magnetic field component of the propagating electromagnetic wave in the first direction, and further induce a magnetic polarization in the second direction that negatively corresponds (in accordance with the negative magnetic susceptibility) to a magnetic field component of the propagating electromagnetic wave in the second direction. Operation 1220 optionally further includes sub-operation 1223—inducing a third polarization in a third direction, the third polarization positively corresponding to a third component of the electromagnetic field in the third direction—and sub-operation 1224—inducing a fourth polarization in a fourth direction perpendicular to the third direction, the fourth polarization negatively corresponding to a fourth component of the electromagnetic field in the fourth direction. For example, a conversion structure 100 as in FIG. 1 may provide an indefinite medium having both an indefinite permittivity and an indefinite permeability, the indefinite permittivity corresponding to a electric susceptibility that is positive in a first direction and negative in a second direction (where the first and second directions may correspond to the axial and transverse directions 150 and 151 in FIG. 1, or vice versa) and the indefinite permeability corresponding to a magnetic susceptibility that is positive in a third direction and negative in a fourth direction (where the third and fourth directions may correspond to the axial and transverse directions 150 and 151 of FIG. 1, or vice versa). Then the propagating electromagnetic wave 125 may induce: (1) an electric polarization in the first direction that positively corresponds (in accordance with the positive electric susceptibility) to an electric field component of the propagating electromagnetic wave in the first direction, (2) an electric polarization in the second direction that negatively corresponds (in accordance with the negative electric susceptibility) to an electric field component of the propagating electromagnetic wave in the second direction, (3) a magnetic polarization in the third direction that positively corresponds (in accordance with the positive magnetic susceptibility) to a magnetic field component of the propagating electromagnetic wave in the second direction, and (4) a magnetic polarization in the fourth direction that negatively corresponds (in accordance with the negative magnetic susceptibility) to a magnetic field component of the propagating electromagnetic wave in the fourth direction. Flow 1200 includes operation 1230—providing the propagated electromagnetic energy as a non-evanescent electromagnetic wave at the output region. For example, the conversion structure 100 of FIG. 1 provides a non-evanescent electromagnetic wave 130 at the second surface region 112; the non-evanescent electromagnetic wave may be a freely-propagating electromagnetic wave, e.g. a wave that is emitted by and freely radiates from the second electromagnetic surface, or a confinedly-propagating electromagnetic wave, e.g. a wave that is transmitted by the second surface region into a propagating guided wave mode (as in a waveguide, transmission line, optical fiber, etc.).

Figure 13:
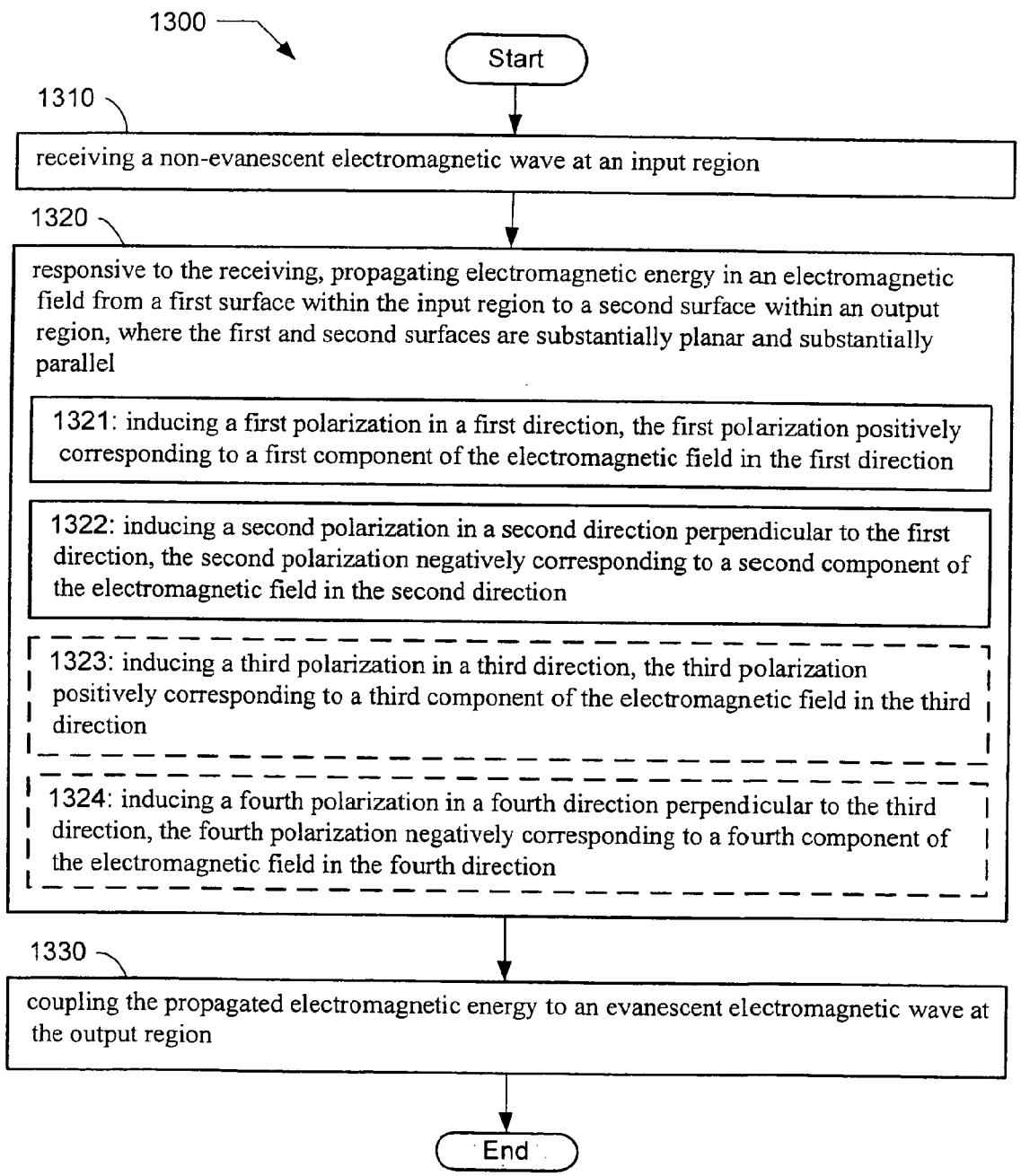
FIG. 13 depicts a second process flow reciprocal to the first process flow.

An illustrative embodiments is depicted as a process flow diagram in FIG. 13. Flow 1300 includes operation 1310—receiving a non-evanescent electromagnetic wave at an input region. For example, a conversion structure, such as that depicted as element 100 in FIG. 1, receives (in a reciprocal scenario to that of FIG. 1, as described previously) a non-evanescent electromagnetic wave 130 at the second surface region 112. Flow 1300 includes operation 1320—responsive to the receiving, propagating electromagnetic energy in an electromagnetic field from a first surface within the input region to a second surface within an output region, where the first and second surfaces are substantially planar and substantially parallel. For example, the conversion structure 100 in FIG. 1 conveys (in a reciprocal scenario to that of FIG. 1, as described previously) a propagating electromagnetic wave 125 from the second surface region 112 to the first surface region 111. The first surface may be an exterior surface of the input region, or at least partially within an interior portion of the input region (e.g. corresponding to a conversion structure having a second surface region 112 that is at least partially interior to the conversion structure). The second surface may be an exterior surface of the output region, or at least partially within an interior portion of the output region (e.g. corresponding to a conversion structure having an first surface region 111 that is at least partially interior to the conversion structure). Operation 1320 includes sub-operation 1321—inducing a first polarization in a first direction, the first polarization positively corresponding to a first component of the electromagnetic field in the first direction—and sub-operation 1322—inducing a second polarization in a second direction perpendicular to the first direction, the second polarization negatively corresponding to a second component of the electromagnetic field in the second direction. For example, a conversion structure 100 as in FIG. 1 may provide an indefinite medium having an indefinite permittivity, and the indefinite permittivity may correspond to an electric susceptibility that is positive in a first direction and negative in a second direction (where the first and second directions may correspond to the axial and transverse directions 150 and 151 in FIG. 1, or vice versa). Then the propagating electromagnetic wave 125 may induce an electric polarization in the first direction that positively corresponds (in accordance with the positive electric susceptibility) to an electric field component of the propagating electromagnetic wave in the first direction, and further induce an electric polarization in the second direction that negatively corresponds (in accordance with the negative electric susceptibility) to an electric field component of the propagating electromagnetic wave in the second direction. In an alternate example, a conversion structure 100 as in FIG. 1 may provide an indefinite medium having an indefinite permeability, and the indefinite permeability may correspond to a magnetic susceptibility that is positive in a first direction and negative in a second direction (where the first and second directions may correspond to the axial and transverse directions 150 and 151 in FIG. 1, or vice versa). Then the propagating electromagnetic wave 125 may induce a magnetic polarization in the first direction that positively corresponds (in accordance with the positive magnetic susceptibility) to a magnetic field component of the propagating electromagnetic wave in the first direction, and further induce a magnetic polarization in the second direction that negatively corresponds (in accordance with the negative magnetic susceptibility) to a magnetic field component of the propagating electromagnetic wave in the second direction. Operation 1320 optionally further includes sub-operation 1323—inducing a third polarization in a third direction, the third polarization positively corresponding to a third component of the electromagnetic field in the third direction—and sub-operation 1324—inducing a fourth polarization in a fourth direction perpendicular to the third direction, the fourth polarization negatively corresponding to a fourth component of the electromagnetic field in the fourth direction. For example, a conversion structure 100 as in FIG. 1 may provide an indefinite medium having both an indefinite permittivity and an indefinite permeability, the indefinite permittivity corresponding to a electric susceptibility that is positive in a first direction and negative in a second direction (where the first and second directions may correspond to the axial and transverse directions 150 and 151 in FIG. 1, or vice versa) and the indefinite permeability corresponding to a magnetic susceptibility that is positive in a third direction and negative in a fourth direction (where the third and fourth directions may correspond to the axial and transverse directions 150 and 151 of FIG. 1, or vice versa). Then the propagating electromagnetic wave 125 may induce: (1) an electric polarization in the first direction that positively corresponds (in accordance with the positive electric susceptibility) to an electric field component of the propagating electromagnetic wave in the first direction, (2) an electric polarization in the second direction that negatively corresponds (in accordance with the negative electric susceptibility) to an electric field component of the propagating electromagnetic wave in the second direction, (3) a magnetic polarization in the third direction that positively corresponds (in accordance with the positive magnetic susceptibility) to a magnetic field component of the propagating electromagnetic wave in the second direction, and (4) a magnetic polarization in the fourth direction that negatively corresponds (in accordance with the negative magnetic susceptibility) to a magnetic field component of the propagating electromagnetic wave in the fourth direction. Flow 1300 includes operation 1330—coupling the propagated electromagnetic energy to an evanescent electromagnetic wave at the output region. For example, the conversion structure 100 of FIG. 1 provides (in a reciprocal scenario to that of FIG. 1, as described previously) an evanescent electromagnetic wave 120 at the first surface region 111 (the evanescent wave having an exponential decay away from the conversion structure for this reciprocal scenario, not decaying towards the conversion structure as depicted).

Figure 14:
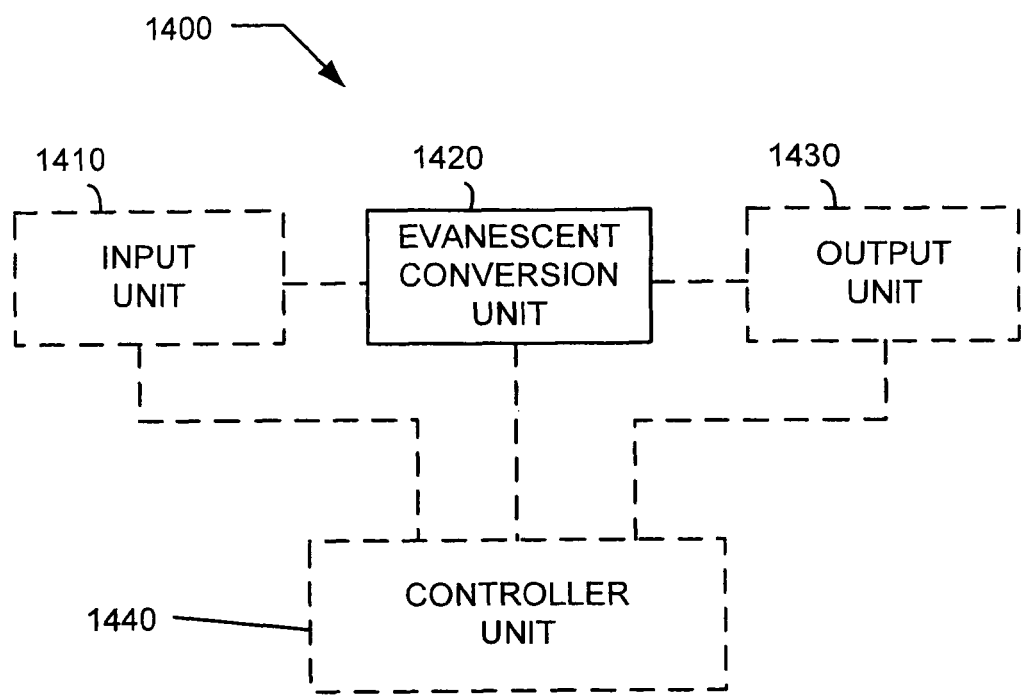
FIG. 14 depicts a system that includes an evanescent conversion unit.

With reference now to FIG. 14, an illustrative embodiment is depicted as a system block diagram. The system 1400 includes an evanescent conversion unit 1420 optionally coupled to a control unit 1440. The evanescent conversion unit 1420 may include a conversion structure such as that depicted as element 100 in FIGS. 1-11. The conversion structure may be a variable conversion structure, such as a variable metamaterial responsive to one or more control inputs to vary one or more operating characteristics (operating frequency, operating wave polarization, effective coordinate transformation for a transformation medium, etc), and the control unit 1440 may include control circuitry that provides one or more control inputs to the variable conversion structure. The evanescent conversion unit 1420 may further include a positioning structure (e.g. with one or more piezo stages, nanopositioners, conveyors/turntables, or other actuators) having one or more control inputs to vary a position/orientation of the conversion structure and/or vary a position/orientation of a sample or target in relation to the conversion structure (e.g. within an evanescent range of the conversion structure), and the control unit 1440 may include control circuitry that provides the one or more control inputs to the positioning structure, optionally in response to a feedback signal from the positioning structure (e.g. a cantilever force feedback). The evanescent conversion unit 1420 may include one or more optical components, e.g. positioned to deliver electromagnetic energy to an input surface of the conversion structure, receive electromagnetic energy from an output surface of the conversion structure, deliver electromagnetic energy to a sample or target positioned within an evanescent range of the conversion structure, and/or receive electromagnetic energy from a sample or target positioned within an evanescent range of the conversion structure; and the control unit 1440 may include control circuitry that provides one or more control inputs to the one or more optical components (e.g. to control orientations, focusing characteristics, aperture sizes, etc.). The system optionally includes an input unit 1410 coupled to the evanescent conversion unit 1420 (e.g. to deliver electromagnetic energy to the evanescent conversion unit 1420); the input unit may include an electromagnetic source (e.g. an antenna, laser, or transducer) as well as input circuitry and/or optical components such as modulators, phase adjusters, etc. The system optionally includes an output unit 1430 coupled to the evanescent conversion unit 1420 (e.g. to receive electromagnetic energy from the evanescent conversion unit 1420); the output unit may include an electromagnetic detector (e.g. a CCD array, photomultiplier, etc.) as well as output circuitry and/or optical components such as demodulators, phase adjusters, spectral analyzers, image processing circuitry, etc.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   coupling to an evanescent electromagnetic wave at an input region;
   responsive to the coupling, propagating electromagnetic energy in an electromagnetic field from a first surface within the input region to a second surface within an output region, where the first and second surfaces are substantially planar and substantially parallel, and where the propagating includes:
      inducing a first polarization in a first direction, the first polarization positively corresponding to a first component of the electromagnetic field in the first direction; and
      inducing a second polarization in a second direction perpendicular to the first direction, the second polarization negatively corresponding to a second component of the electromagnetic field in the second direction;
   and
   providing the propagated electromagnetic energy as a non-evanescent electromagnetic wave at the output region; and
   wherein:
      the coupling to the evanescent electromagnetic wave is a coupling to the evanescent electromagnetic wave at a first frequency with a first wavenumber, and the providing of the non-evanescent electromagnetic wave is a providing of the non-evanescent electromagnetic wave at the first frequency with a second wavenumber, the first wavenumber corresponding to a surface parallel direction of the first surface and the second wavenumber corresponding to a surface parallel direction of the second surface;
      the first and second surfaces define an interior region intermediate the first and second surfaces, a first exterior region outside the interior region and adjacent to the first surface defines a first phase velocity for electromagnetic radiation, and the first wavenumber is greater than the first frequency divided by the first phase velocity; and
      a second exterior region outside the interior region and adjacent to the second surface defines a second phase velocity for electromagnetic radiation, and the second wavenumber is less than the first frequency divided by the second phase velocity.

2. The method of claim 1, wherein the first surface is an exterior surface of the input region.

3. The method of claim 1, wherein the second surface is an exterior surface portion of the output region.

4. The method of claim 1, wherein the first polarization is a first electric polarization, the first component is a first electric component, the second polarization is a second electric polarization, and the second component is a second electric component.

5. The method of claim 1, wherein the first polarization is a first magnetic polarization, the first component is a first magnetic component, the second polarization is a second magnetic polarization, and the second component is a second magnetic component.

6. The method of claim 1, wherein the first direction is a non-constant direction that is a function of location intermediate the first and second surfaces.

7. The method of claim 1, wherein the second direction is a non-constant direction that is a function of location intermediate the first and second surfaces.

8. The method of claim 1, wherein the propagating further includes:
inducing a third polarization in a third direction, the third polarization positively corresponding to a third component of the electromagnetic field in the third direction; and
inducing a fourth polarization in a fourth direction perpendicular to the third direction, the fourth polarization negatively corresponding to a fourth component of the electromagnetic field in the fourth direction.

9. The method of claim 8, wherein the third direction is substantially equal to the first direction.

10. The method of claim 8, wherein the third direction is substantially equal to the second direction.

11. The method of claim 8, wherein the third direction is substantially mutually perpendicular to the first and second directions.

12. The method of claim 8, wherein the fourth direction is substantially equal to the first direction.

13. The method of claim 8, wherein the fourth direction is substantially equal to the second direction.

14. The method of claim 8, wherein the fourth direction is substantially mutually perpendicular to the first and second directions.

15. The method of claim 8, wherein the first polarization is a first electric polarization, the first component is a first electric component, the second polarization is a second electric polarization, the second component is a second electric component, the third polarization is a first magnetic polarization, the third component is a first magnetic component, the fourth polarization is a second magnetic polarization, and the fourth component is a second magnetic component.

16. The method of claim 1, wherein the propagating is a propagating along a propagation direction that substantially coincides with the first direction.

17. The method of claim 1, wherein the propagating is a propagating along a propagation direction that substantially coincides with the second direction.

18. The method of claim 1, wherein the propagating is a propagating along at least two propagation directions, each of the at least two propagation directions substantially having a common angle with respect to the first direction.

19. The method of claim 1, wherein the propagating is a propagating along at least two propagation directions, each of the at least two propagation directions substantially having a common angle with respect to the second direction.

20. The method of claim 1, wherein the propagating is a propagating along a plurality of propagation directions, the plurality of propagation directions substantially composing a cone having a cone axis that substantially coincides with the first direction.

21. The method of claim 1, wherein the propagating is a propagating along a plurality of propagation directions, the plurality of propagation directions substantially composing a cone having a cone axis that substantially coincides with the second direction.

22. The method of claim 1, wherein the propagating of electromagnetic energy in the electromagnetic field is a propagating of electromagnetic energy in the electromagnetic field at the first frequency within the interior region.

23. The method of claim 22, where the electromagnetic field defines a transverse wavenumber, and the propagating of electromagnetic energy in the electromagnetic field at the first frequency within the interior region provides a substantially continuous variation of the transverse wavenumber from the first wavenumber at the first surface to the second wavenumber at the second surface.

24. The method of claim 23, wherein the substantially continuous variation is a substantially continuous variation along a propagation direction of the electromagnetic field.

25. A method, comprising:
receiving a non-evanescent electromagnetic wave at an input region;
responsive to the receiving, propagating electromagnetic energy in an electromagnetic field from a first surface within the input region to a second surface within an output region, where the first and second surfaces are substantially planar and substantially parallel, and where the propagating includes:
inducing a first polarization in a first direction, the first polarization positively corresponding to a first component of the electromagnetic field in the first direction; and
inducing a second polarization in a second direction perpendicular to the first direction, the second polarization negatively corresponding to a second component of the electromagnetic field in the second direction;
and
coupling the propagated electromagnetic energy to an evanescent electromagnetic wave at the output region; and
wherein:
the receiving of the non-evanescent electromagnetic wave is a receiving of the non-evanescent electromagnetic wave at a first frequency with a first wavenumber, and the coupling to the evanescent electromagnetic wave is a coupling to the evanescent electromagnetic wave at the first frequency with a second wavenumber, the first wavenumber corresponding to a surface parallel direction of the first surface and the second wavenumber corresponding to a surface parallel direction of the second surface;
the first and second surfaces define an interior region intermediate the first and second surfaces, a first exterior region outside the interior region and adjacent to the first surface defines a first phase velocity for electromagnetic radiation, and the first wavenumber is less than the first frequency divided by the first phase velocity; and
a second exterior region outside the interior region and adjacent to the second surface defines a second phase velocity for electromagnetic radiation, and the second wavenumber is greater than the first frequency divided by the second phase velocity.

26. The method of claim 25, wherein the first surface is an exterior surface of the input region.

27. The method of claim 25, wherein the second surface is an exterior surface portion of the output region.

28. The method of claim 25, wherein the first polarization is a first electric polarization, the first component is a first electric component, the second polarization is a second electric polarization, and the second component is a second electric component.

29. The method of claim 25, wherein the first polarization is a first magnetic polarization, the first component is a first magnetic component, the second polarization is a second magnetic polarization, and the second component is a second magnetic component.

30. The method of claim 25, wherein the first direction is a non-constant direction that is a function of location intermediate the first and second surfaces.

31. The method of claim 25, wherein the second direction is a non-constant direction that is a function of location intermediate the first and second surfaces.

32. The method of claim 25, wherein the propagating further includes:
inducing a third polarization in a third direction, the third polarization positively corresponding to a third component of the electromagnetic field in the third direction; and
inducing a fourth polarization in a fourth direction perpendicular to the third direction, the fourth polarization negatively corresponding to a fourth component of the electromagnetic field in the fourth direction.

33. The method of claim 32, wherein the third direction is substantially equal to the first direction.

34. The method of claim 32, wherein the third direction is substantially equal to the second direction.

35. The method of claim 32, wherein the third direction is substantially mutually perpendicular to the first and second directions.

36. The method of claim 32, wherein the fourth direction is substantially equal to the first direction.

37. The method of claim 32, wherein the fourth direction is substantially equal to the second direction.

38. The method of claim 32, wherein the fourth direction is substantially mutually perpendicular to the first and second directions.

39. The method of claim 32, wherein the first polarization is a first electric polarization, the first component is a first electric component, the second polarization is a second electric polarization, the second component is a second electric component, the third polarization is a first magnetic polarization, the third component is a first magnetic component, the fourth polarization is a second magnetic polarization, and the fourth component is a second magnetic component.

40. The method of claim 25, wherein the propagating is a propagating along a propagation direction that substantially coincides with the first direction.

41. The method of claim 25, wherein the propagating is a propagating along a propagation direction that substantially coincides with the second direction.

42. The method of claim 25, wherein the propagating is a propagating along at least two propagation directions, each of the at least two propagation directions substantially having a common angle with respect to the first direction.

43. The method of claim 25, wherein the propagating is a propagating along at least two propagation directions, each of the at least two propagation directions substantially having a common angle with respect to the second direction.

44. The method of claim 25, wherein the propagating is a propagating along a plurality of propagation directions, the plurality of propagation directions substantially composing a cone having a cone axis that substantially coincides with the first direction.

45. The method of claim 25, wherein the propagating is a propagating along a plurality of propagation directions, the plurality of propagation directions substantially composing a cone having a cone axis that substantially coincides with the second direction.

46. The method of claim 25, wherein the propagating of electromagnetic energy in the electromagnetic field is a propagating of electromagnetic energy in the electromagnetic field at the first frequency within the interior region.

47. The method of claim 46, where the electromagnetic field defines a transverse wavenumber, and the propagating of electromagnetic energy in the electromagnetic field at the first frequency within the interior region provides a substantially continuous variation of the transverse wavenumber from the first wavenumber at the first surface to the second wavenumber at the second surface.

48. The method of claim 47, wherein the substantially continuous variation is a substantially continuous variation along a propagation direction of the electromagnetic field.

* * * * *